US012527873B2

(12) United States Patent
Panitch et al.

(10) Patent No.: US 12,527,873 B2
(45) Date of Patent: Jan. 20, 2026

(54) GLYCOCALYX MIMETIC COATINGS

(71) Applicant: The Regents of The University of California, Oakland, CA (US)

(72) Inventors: Alyssa Panitch, Davis, CA (US); Tima Dehghani, Davis, CA (US); Harkanwalpreet Sodhi, Davis, CA (US); Kit Lam, Davis, CA (US); Ruiwu Liu, Sacramento, CA (US); Xiaocen Li, Sacramento, CA (US); Nipavan Chiamvimonvat, Davis, CA (US); Phung N. Thai, Davis, CA (US)

(73) Assignee: The Regents of the University of California, Oakland, CA (US)

( * ) Notice: Subject to any disclaimer, the term of this patent is extended or adjusted under 35 U.S.C. 154(b) by 908 days.

(21) Appl. No.: 17/470,976

(22) Filed: Sep. 9, 2021

(65) Prior Publication Data
US 2022/0133897 A1     May 5, 2022

Related U.S. Application Data

(63) Continuation of application No. PCT/US2020/025418, filed on Mar. 27, 2020.

(60) Provisional application No. 62/826,920, filed on Mar. 29, 2019.

(51) Int. Cl.
| | |
|---|---|
| *A61K 47/61* | (2017.01) |
| *A61K 38/00* | (2006.01) |
| *A61P 9/10* | (2006.01) |
| *C07K 7/06* | (2006.01) |

(52) U.S. Cl.
CPC .............. *A61K 47/61* (2017.08); *A61P 9/10* (2018.01); *C07K 7/06* (2013.01); *A61K 38/00* (2013.01)

(58) Field of Classification Search
None
See application file for complete search history.

(56) References Cited

U.S. PATENT DOCUMENTS

| 7,129,052 B1 | 10/2006 | Roberts et al. |
| 2016/0129082 A1 | 5/2016 | Matern et al. |
| 2018/0326077 A1 | 11/2018 | Panitch et al. |

FOREIGN PATENT DOCUMENTS

| EP | 0468714 A2 | 1/1992 | |
| WO | WO-2015175565 A2 * | 11/2015 | ............. A61K 47/42 |
| WO | 2020/205602 A1 | 10/2020 | |

OTHER PUBLICATIONS

Kellock et al., "Peptides Comprised of Alternating L- and D- Amino Acids Inhibit Amyloidogenesis in Three Distinct Amyloid Systems Independent of Sequence", Journal of Molecular Biology, vol. 428, No. 11, Jun. 5, 2016, pp. 2317-2328.

"International Search Report and Written Opinion," mailed Jul. 1, 2020, in International Application No. PCT/US2020/025418. 11 pages.

* cited by examiner

*Primary Examiner* — Sudhakar Katakam
*Assistant Examiner* — Tara L Martinez
(74) *Attorney, Agent, or Firm* — Kilpatrick Townsend and Stockton LLP

(57) ABSTRACT

Provided herein are selectin-binding peptide ligands having both D- and L-amino acids, and peptide conjugates including the provided peptide ligands. The peptide conjugates can include a biopolymer backbone, such as dermatan sulfate, and 33 or fewer peptide ligands conjugated to the biopolymer. Also provided are methods for using the provided peptide conjugates to treat patients suffering from endothelial dysfunction.

11 Claims, 16 Drawing Sheets

Specification includes a Sequence Listing.

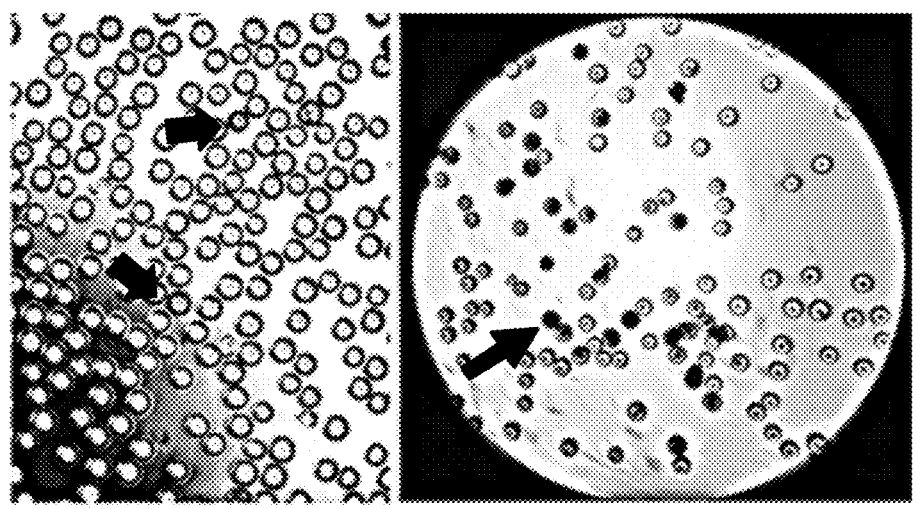
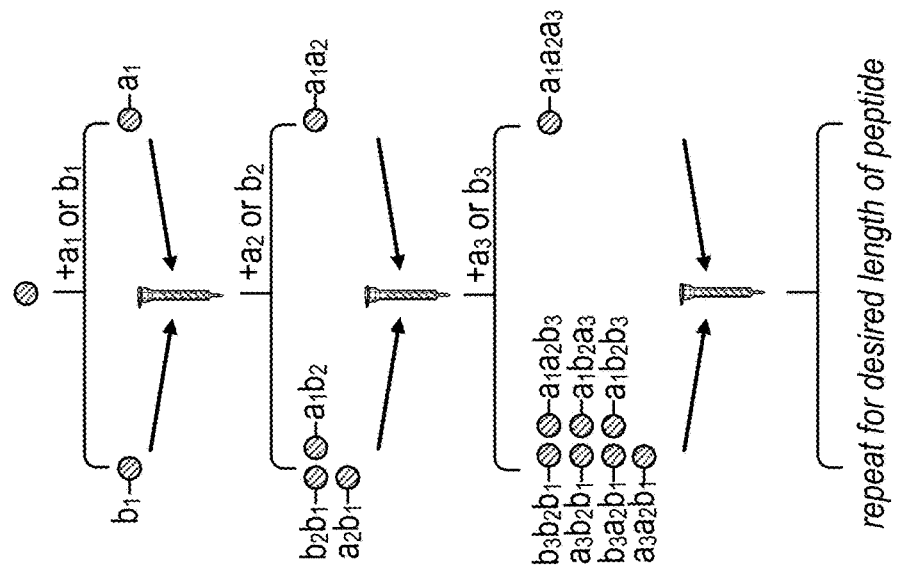
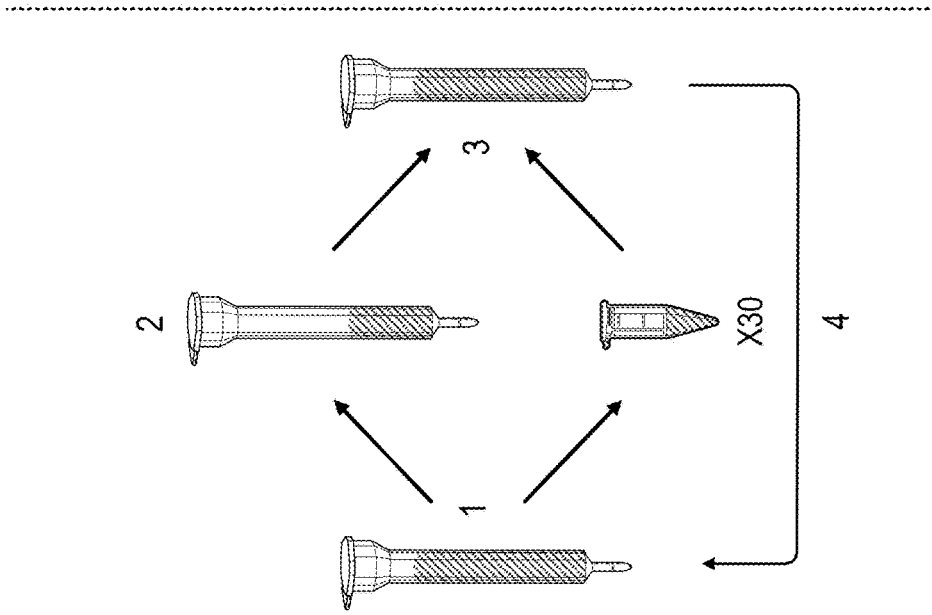
FIG. 1

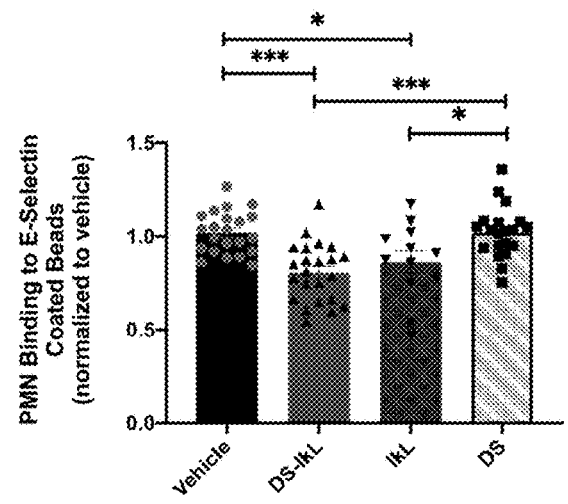
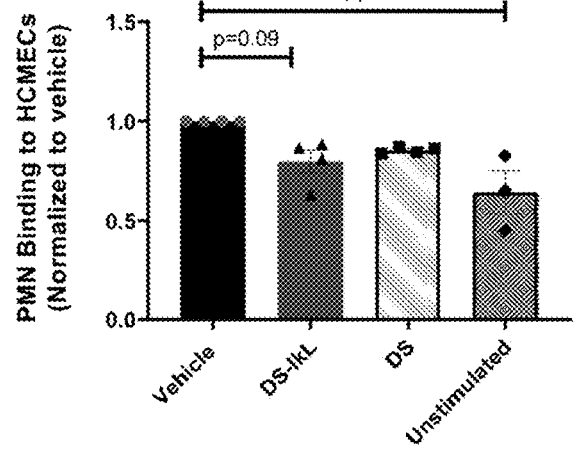
FIG. 9                    FIG. 10
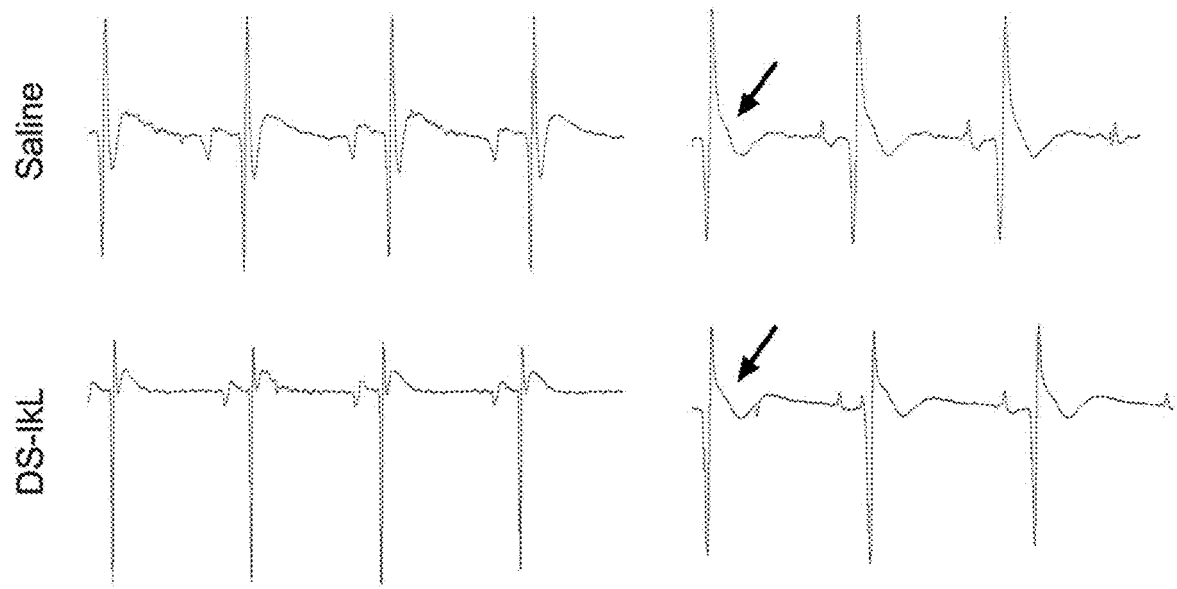
FIG. 11

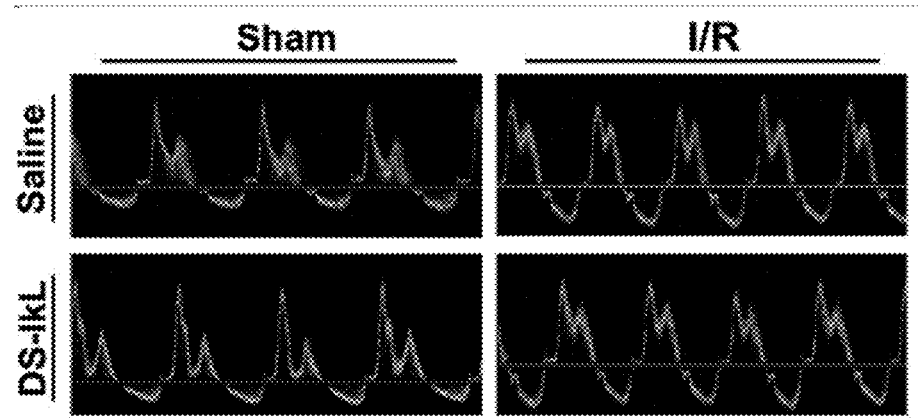
FIG. 19
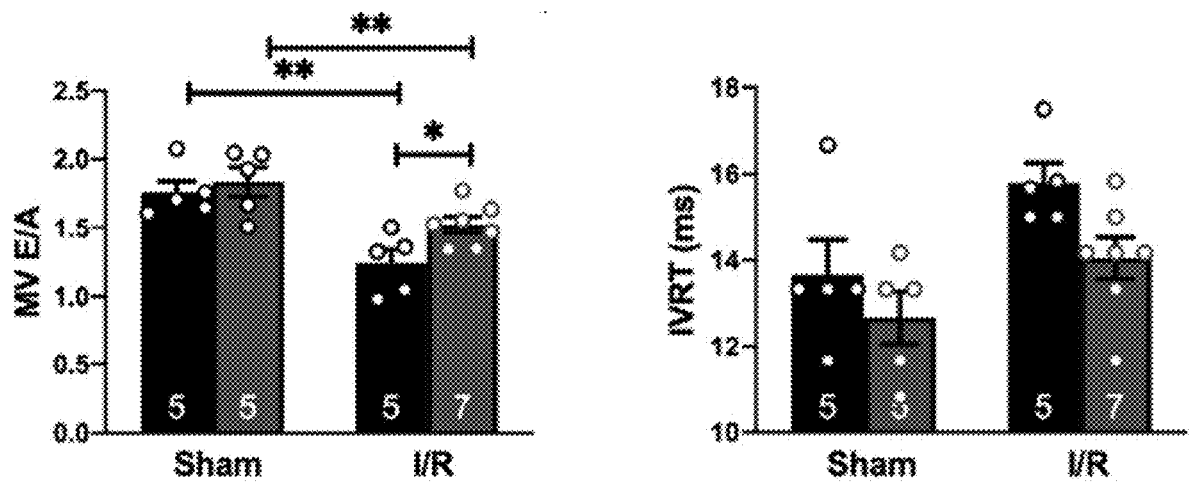
FIG. 20
FIG. 21
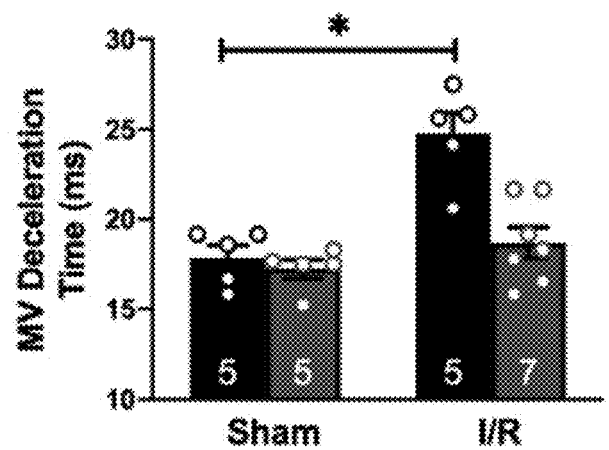
FIG. 22

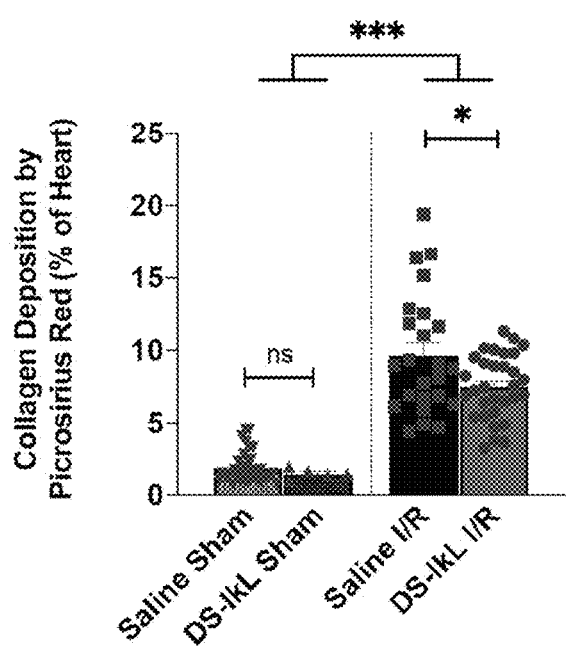
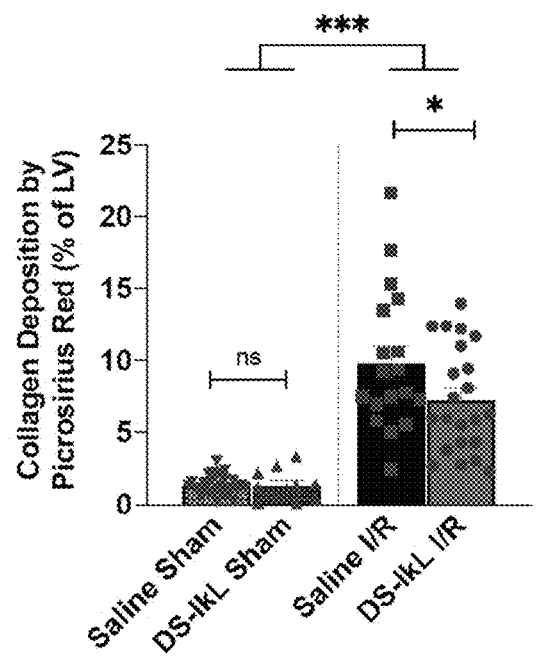
FIG. 26     FIG. 27
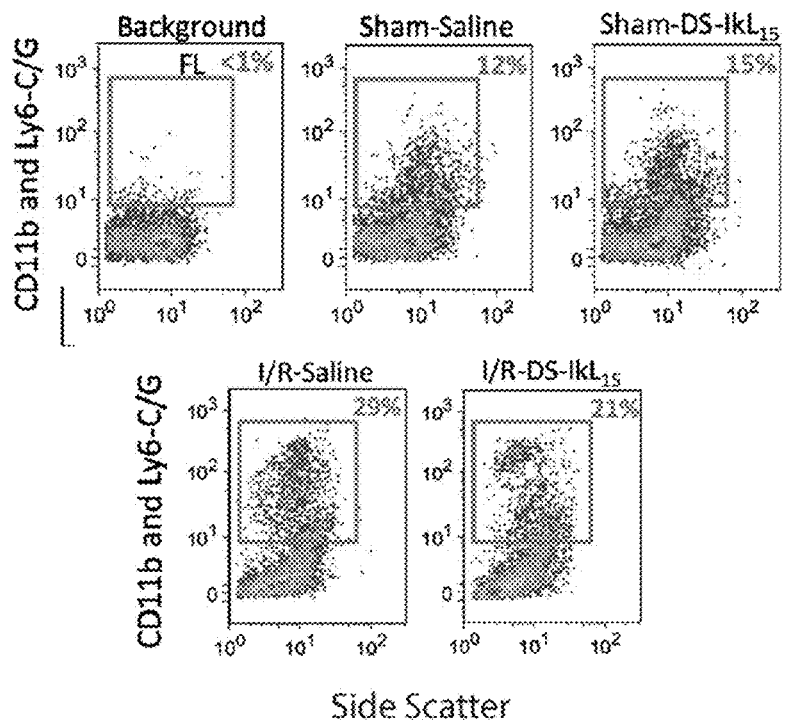
FIG. 28

GLYCOCALYX MIMETIC COATINGS

CROSS-REFERENCE TO RELATED APPLICATIONS

The present application is a continuation of International Application No. PCT/US2020/025418 filed Mar. 27, 2020, which claims priority to U.S. Provisional Application No. 62/826,290 filed Mar. 29, 2019, the full disclosure of which is incorporated by reference in its entirety for all purposes.

REFERENCE TO A SEQUENCE LISTING

The Sequence Listing written in file 070772-228310US-1269549_SL.txt created on Sep. 8, 2021, 4,064 bytes, machine format IBM-PC, MS-Windows operating system, is hereby incorporated by reference in its entirety for all purposes.

BACKGROUND

Chronic obstructive pulmonary disease (COPD) is a progressive lung disease characterized by airflow obstruction and destruction of lung tissue due to inflammatory responses to noxious stimuli. COPD patients are highly susceptible to acute exacerbations, with the majority of those exacerbations occurring world-wide brought on by exposure to air pollutants including cigarette smoke (Barnes P J. *Thorax.* 2003; 58(9):803). Acute exacerbations are associated with detrimental changes in lung function, including endothelial dysfunction (Yang Q et al. *Curr. Drug Metab.* 2008; 9(7):661-667).

Endothelial dysfunction is characterized by the loss of the glycocalyx, a thin, glycosaminoglycan-rich layer resident on the endothelial cell (EC) surface which provides a protective interface that regulates immune cell adhesion. For example, damaged endothelial cells shed their glycocalyx during the excessive inflammation that is one of the hallmarks of myocardial infarction. The glycocalyx is known to play a role in many cellular processes, including mechanotransduction (McDonald, K. K. et al., *PLoS One.* 2016; 11(12):e0167576), microvascular permeability (van Haaren, P. M. et al. *Am J Physiol Heart Circ Physiol,* 2003; 285(6):H2848-56), and modulation of inflammatory mediators (Sieve, I., A. K. Munster-Kuhnel, and D. Hilfiker-Kleiner. *Vascul Pharmacol.* 2018; 100:26-33). Diminution of the endothelial glycocalyx has been shown to contribute to vascular edema as well as neutrophil and platelet adhesion (McDonald, K. K. et al. *PLoS One.* 2016; 11(12):e0167576; Rehm, M. et al. *Circulation.* 2007; 116(17); 1896-1906).

In particular, loss of the glycocalyx layer results in increased exposure of EC adhesion molecules such as E- and P-selectin, prompting neutrophil and platelet binding and an augmented inflammatory response. Once bound, activated neutrophils diapedese through the endothelial monolayer to the pleural tissue, where they stimulate additional inflammation and fibrosis. Endothelial dysfunction is a common pathological component of COPD and has recently been suggested as a major contributor to the disease (Green CE and Turner AM. *Respir. Res.* 2017; 18(1):20). E-selectin expression on lung endothelial cells strongly correlates with neutrophil numbers recovered in the lung (Di Stefano A et al. *Am. J. Respir. Crit. Care Med.* 1994; 149:803). Various chemokines are released in response to inflammatory stimuli and synergize with E-selectin on the surface of ECs to enhance neutrophil migration into tissue (Schaff U et al. *J Leukoc. Biol.* 2008; 83(1):99). During acute exacerbation of airway inflammation, the increased E-selectin expression on COPD lung endothelial cells and the increased chemokine gradient recruit neutrophils to the affected lung tissue (Miller L A et al. *J. Leukoc. Biol.* 2000; 68(2):201). Indeed, studies of patients with mild COPD have shown increases in the number of neutrophils in bronchial biopsies and levels of TNF-α, IL-6, and IL-8 in induced sputum (Aaron S D et al. *Am. J. Respir. Crit. Care Med.* 2001; 163(2):349).

Therapeutics that target the dysfunctional endothelium and limit neutrophil infiltration into the diseased lung can play a major role in treatment of COPD. Glycosaminoglycans (GAGs) such as heparin, heparan sulfate, and dermatan sulfate (DS) are a main component of the glycocalyx, the endothelial surface layer that is required in many biological processes including cell migration by adhesion (Celie JWAM et al. *Front. Biosci Landmark Ed.* 2009; 14:4932) and the in vivo function of chemokines (Proudfoot A E I et al. *Pharmaceuticals (Basel).* 2017; 10(3)). GAG binding was originally thought to be important in generating the chemokine gradient toward which cell migration can be directed. However, emerging evidence suggests that GAGs shield adhesion molecules, preventing adhesion of inflammatory cells such as neutrophils (Granger D N and Senchenkova E. *Inflammation and the Microcirculation*. San Rafael (CA): Morgan & Claypool Life Sciences; 2010). Activated and adherent neutrophils release proteases and other products that degrade the glycocalyx, exposing additional adhesion molecules and amplifying the inflammatory cascade. Overexpressed adhesion molecules are therefore a promising target for anti-inflammatory therapeutics.

One example of such an anti-inflammatory molecule, EC-SEAL, has been shown to bind to selectins on inflamed endothelium and to suppresses platelet and neutrophil binding and diapedesis (Wodicka J et al. *Pharmaceuticals.* 2017; 10(4):36). Three different E-selectin binding peptide sequences were evaluated during the development of EC-SEAL, with the most successful, IELLQARGC (IEL) (Fukuda M N et al. *Cancer Res.* 2000; 60(2):450), selected for molecule synthesis. However, this molecule is made solely of naturally occurring L-amino acids, leaving it vulnerable to enzymatic degradation.

Additionally, heart disease remains the leading cause of death in the US, and ischemic heart disease is responsible for about half of these deaths. Further, acute coronary syndromes (ACS) are responsible for the largest share of mortality among the etiologies of coronary heart disease, with ST-segment elevation myocardial infarction (STEMI), a form of ischemic heart injury, comprising 30-33% of all ACS. Revascularization of diseased coronary arteries has improved survival rates for STEMI patients, but has also led to downstream issues of ischemia reperfusion (IR) injury of the reperfused cardiac tissue.

The effects of reperfusion injury are complex. In the absence of oxygen, ischemic tissues experience severe disruptions to their homeostasis. A necessary shift from aerobic to anaerobic metabolism results in the accumulation of lactic acid, which contributes to a decline in intracellular pH, an impairment of ion exchange, and an increase in reactive oxygen species (ROS) production (Kalogeris, T. et al. *Int. Rev. Cell Mol. Biol.* 2012; 298:229-317; Hausenloy, D. J. and D. M. Yellon. *J. Clin. Invest.* 2013; 123(1):92-100), subsequently damaging cells within the vicinity. Paradoxically, the restoration of blood flow further contributes to cellular damage, partly due to inefficient oxidative phosphorylation that results in further production of reactive oxygen species, reductions in nitric oxide (NO), and the recruitment of immune cells (Rusinkevich, V. et al. *Acta Pharmacol. Sin.*

2019; 40(9):1168-1183; Frangogiannis, N. G. Nat. Rev. Cardiol. 2014; 11(5): p. 255-265).

Increased permeability of the vasculature potentiates reperfusion injury by allowing the infiltration of immune cells into the tissue. Reperfused endothelial cells experience disruptions to their $Ca^{2+}$ homeostasis and begin to contract (Hausenloy, D. J. et al. *Cardiovasc Res.* 2019; 115(7):1143-1155), giving rise to endothelial gaps that facilitate the extravasation of leukocytes being recruited by ROS and cytokines. Ischemia/reperfusion (I/R) induced damage to vascular endothelial cells initiates an inflammatory cascade that recruits neutrophils and platelets to the sites of damage (Rusinkevich, V. et al. *Acta Pharmacol. Sin.* 2019; 40(9): 1168-1183). Though these cells have vital cardioprotective functions, over accumulation of leukocytes and activated platelets exacerbates myocardial damage, contributing to the overall infarct size Reperfusion injury also results in congestion of the capillaries that are critical for oxygenation of cardiac tissue. Congestion may occur from emboli that form due to thrombus generation on the angioplasty balloon-damaged vascular wall where exposed underlying extracellular matrix (collagen) promotes clot formation. Bits of soft clot can dislodge, travel downstream, and occlude smaller vessels. In addition, occlusion of the cardiac tissue capillaries occurs due to platelet and neutrophil interaction with the resident endothelium that has become inflamed as a result of ischemia followed by reperfusion. Further occlusion can occur due to platelet-collagen interactions at sites where the capillary endothelium is so damaged the cells begin to pull apart and slough off the capillary walls exposing the underlying collagen. Together, the events that lead to congestion result in prolonged impaired blood flow to the heart tissue, thus increasing the damaged area over that which occurs due to the primary coronary artery occlusion itself.

As such, there is a need in the art for improved compounds and methods for reducing the adhesion of inflammatory cells to, for example, endothelial cells. The present disclosure addresses this need and provides associated and other advantages.

BRIEF SUMMARY

In general, provided herein are novel peptides that bind to selectin receptors and can be conjugated to biopolymers and synthetic polymers, thereby targeting the polymers to the endothelial surface. The targeted molecules can form a coating that suppresses binding, e.g., platelet and leukocyte binding, to the endothelium. The peptide features D-amino acids, a reversed peptide sequence, and a reduced number of peptides per biopolymer background. Treatment methods using the provided peptides and related peptide conjugates provide several advantages over existing treatments, e.g., treatments with antibody therapeutics. The provided peptide conjugates are generally smaller than antibody therapeutics (~62 kDa) and have been designed to interrupt multiple parts of the immune pathway simultaneously by masking adhesion molecules on the endothelial surface. In some embodiments, the provided peptide conjugates target dermatan sulfate—a native component of the glycocalyx—for delivery to inflamed endothelium. By blanketing the dysfunctional endothelial surface, the provided peptide conjugates can directly reduce selectin availability while indirectly interfering with immune cell interactions with other adhesion molecules on the endothelial surface. The provided peptide conjugates can, for example, bind to E- and P-selectin, limit neutrophil and platelet adhesion to inflamed endothelial cells, reduce accumulation of neutrophils, macrophages, and/or fibroblasts, and improve cardiac function after myocardial infarction.

In one aspect, the disclosure provides a peptide conjugate comprising a biopolymer and from 3 to 33 independently selected peptide ligands, e.g., from 10 to 20 peptide ligands, conjugated to the biopolymer. The peptide ligands are capable of binding to selectin (e.g., E-selectin, P-selectin, or both E- and P-selectin), and each comprises L-amino acids and D-amino acids. In some embodiments, the percentage of D-amino acids in each peptide ligand is independently from 10% to 50%. In some embodiments, each peptide ligand independently comprises at least one non-proteinogenic amino acid. In certain aspects, each peptide ligand comprises at least one hydroxyproline. In some embodiments, each peptide ligand independently comprises (i) an amino acid sequence selected from the group consisting of IkLLpHypR, IkLLpHypRGC, and IkLLpHypGRGs; or (ii) an amino acid sequence having at least 80% sequence identity with an amino acid sequence selected from the group consisting of IkLLpHypR, IkLLpHypRGC, and IkLLpHypGRGs. In some embodiments, the biopolymer is a glycosaminoglycan. In certain aspects, the glycosaminoglycan comprises dermatan sulfate.

In another aspect, the disclosure provides a peptide ligand consisting of less than 13 amino acids. The peptide ligand is capable of binding to selectin (e.g., E-selectin, P-selectin, or both E- and P-selectin), and comprises L-amino acids and D-amino acids. In some embodiments, the peptide ligand comprises from 10% to 50% D-amino acids. In some embodiments, the peptide ligand comprises at least one non-proteinogenic amino acid. In certain aspects, the peptide ligand comprises hydroxyproline. In some embodiments, the peptide ligand comprises (i) an amino acid sequence selected from the group consisting of IkLLpHypR, IkLLpHypRGC, and IkLLpHypGRGs; or (ii) an amino acid sequence having at least 80% sequence identity with an amino acid sequence selected from the group consisting of IkLLpHypR, IkLLpHypRGC, and IkLLpHypGRGs.

In another aspect, the disclosure provides a method for treating a patient suffering from a disease associated with endothelial dysfunction. The method comprises administering to the patient a pharmaceutical composition comprising an effective amount of any of the peptide conjugates disclosed herein. In some embodiments, the disease is chronic obstructive pulmonary disease. In some embodiments, the endothelial dysfunction is characterized by a loss of glycocalyx.

BRIEF DESCRIPTION OF THE DRAWINGS

FIG. 1 is an illustration of one-bead-one-peptide library synthesis used to generate selectin-binding sequences as described herein. Left image: A combinatorial peptide library was designed using the split synthesis method of Lam et al. biased toward a known E-selectin binding sequence. (1) Resin was split in half. (2) Half was conjugated to the first amino acid of the selectin binding sequence and the other half divided evenly into 30 tubes each containing a different amino acid. (3) After coupling was complete, resin was combined and deprotected. (4) The cycle was repeated for each amino acid in the selectin binding sequence to create a library with $31^7$ unique peptide sequences. Middle: In each step, resin is divided in two and coupled to a different amino acid, $b_x$ or $a_x$. The cycle is repeated three times to create a library with $2^3$ unique sequences. Right image: An example of the screening result is shown. Resin with peptide that binds E-selectin appears darker (arrows).

FIG. 2 is a graph of neutrophil rolling velocity on E-selectin coated coverslips treated with DS-IkL$_{30}$, EC-SEAL, or GMI-1070. Data presented as means+/−SEM. * denotes p<0.05, p<0.01, *p<0.001. n=1.

FIG. 3 is a graph of neutrophil binding to E-selectin coated microspheres treated with DS alone, IkL peptide, DS-IkL$_{15}$, DS-IkL$_{10}$, or EC-SEAL. Data represent PMN binding to microspheres as assessed by flow cytometry. Data presented as means+/−SD. * represent p<0.05 compared to vehicle. n=3-7 independent experiments.

FIG. 4 is a graph of percent fractional shortening depicting cardiac function and collagen deposition 2 weeks after ischemia and reperfusion. Animals were treated with DS-IkL (n=7) or saline (n=5). Data reported at means+/−SE.

FIG. 5 presents representative images of Masson's trichrome staining of mouse hearts of FIG. 4 when treated with DS-IkL (left) or saline (right).

FIG. 6 is a graph illustrating improved binding to immobilized selectin surfaces with DS-IkL. P- and E-selectin coated surfaces were treated with fluorescently tagged DS-IkL (30 μM, empty bars) or DS (30 μM, filled bars). DS-IkL binding increased with increasing concentration, as assessed by mean fluorescence intensity (MFI) normalized to vehicle (HBSS). Data are represented as means±SEM. *p<0.05, p<0.01, *p<0.001. n=3 independent experiments.

FIG. 7 is a graph illustrating reduction of platelet activation through DS-IkL treatment. Platelet activation on stimulated HCMECs as assessed by NAP-2 was reduced after treatment with DS-IkL (30 μM) and IkL peptide (450 μM), but not DS (30 μM). Data are represented as means±SEM. *p<0.05, p<0.01, *p<0.001. n=3 independent experiments.

FIG. 8 is a graph illustrating reduction of platelet activation through DS-IkL treatment. Platelet activation on stimulated HCMECs as assessed by PF-4 was reduced after treatment with DS-IkL (30 μM) and IkL peptide (450 μM), but not DS (30 μM). Data are represented as means±SEM. *p<0.05. n=3 independent experiments.

FIG. 9 is a graph illustrating reduction of neutrophil binding through DS-IkL treatment. E-selectin coated microspheres were treated with HBSS, DS-IkL, IkL peptide, or DS prior to incubation with isolated human neutrophils (PMN). Data represent PMN binding to microspheres as assessed by flow cytometry. Data are represented as means±SEM. *p<0.05, p<0.01, *p<0.001.

FIG. 10 is a graph illustrating reduction of neutrophil binding through DS-IkL treatment. DS-IkL reduced PMN binding to stimulated HCMECs toward the level of unstimulated controls. Data are represented as means±SEM. **p<0.01. n=4 independent experiments.

FIG. 11 presents images showing representative ECG recordings during surgical procedure. For ischemia/reperfusion mice, confirmation of LAD ligation was done visually (blanching of the heart) and also by the presence of ST-elevation.

FIG. 12 is a graph illustrating DS-IkL targeting to the heart after ischemia/reperfusion. Animals were injected with either fluorophore dissolved in saline (CF594, black bars), or fluorophore conjugated to DS-IkL (CF594-DS-IkL) after surgery and 24 hours later (arrows). Images were taken 1 hour after each injection, and every 12 hours after reperfusion until the 36-hour time point. Data summary is shown at 1, 12, 24, and 36 hours after surgery. Data are represented as means±SEM. *p<0.05, p<0.01; *p<0.001.

FIG. 13 presents images illustrating DS-IkL targeting to the heart after ischemia/reperfusion. The images are of the FIG. 12 animals injected with either fluorophore dissolved in saline, or fluorophore conjugated to DS-IkL after surgery and 24 hours later.

FIG. 14 presents representative M-mode images at the parasternal short-axis for four groups of mice subjected to conscious echocardiography to examine the cardiac structure and function after 2 weeks of reperfusion.

Figure 14:
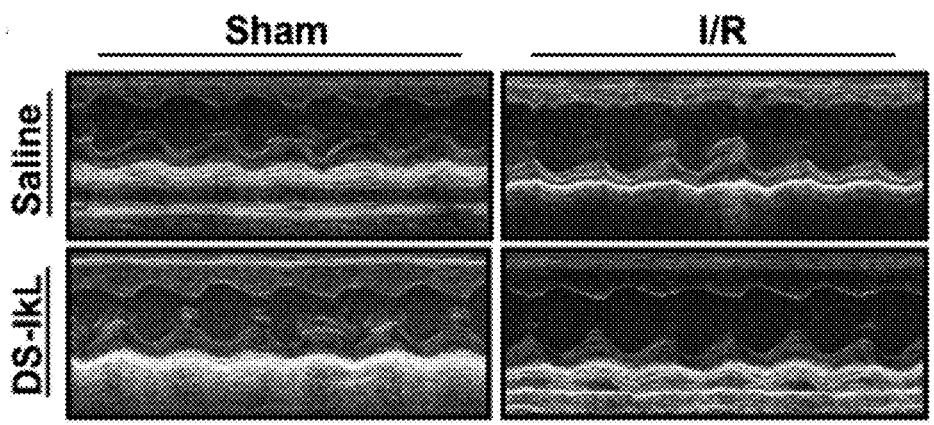

FIG. 19 presents images illustrating assessment of diastolic function by the blood flow velocity through the mitral valve, as shown in representative images in all four groups of the mice of FIG. 14.

FIG. 20 is a graph showing the E/A ratio was significantly decreased in both groups of mice of FIG. 14 but was more obvious in the saline ischemia/reperfusion group. Data are represented as means±SEM. *p<0.05, **p<0.01.

FIG. 21 is a graph showing the isovolumetric relaxation time (IVRT) was not significantly different in all four groups of the mice of FIG. 14. Data are represented as means±SEM.

FIG. 22 is a graph showing there was a difference in the mitral valve (MV) deceleration time in the saline ischemia/reperfusion group vs the saline sham group of the mice of FIG. 14. Data are represented as means±SEM. *p<0.05.

Figure 23:
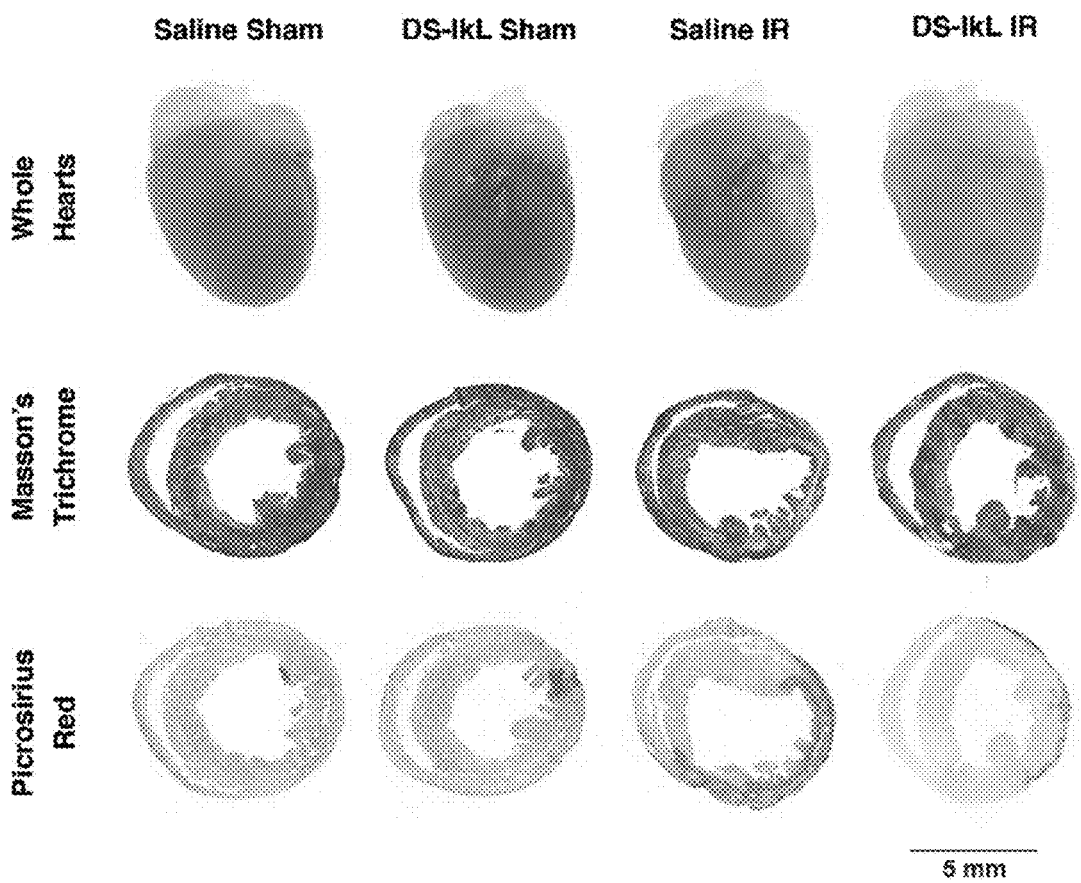

FIG. 23 presents representative images of whole hearts (top), Masson's Trichome (middle), and Picrosirius Red (bottom) stained sections, demonstrating that DS=IkL limited fibrosis after ischemia/reperfusion. Blue areas (Masson's Trichrome, middle) and purple areas (Picrosirius Red, bottom) depict fibrotic areas.

Figure 24:
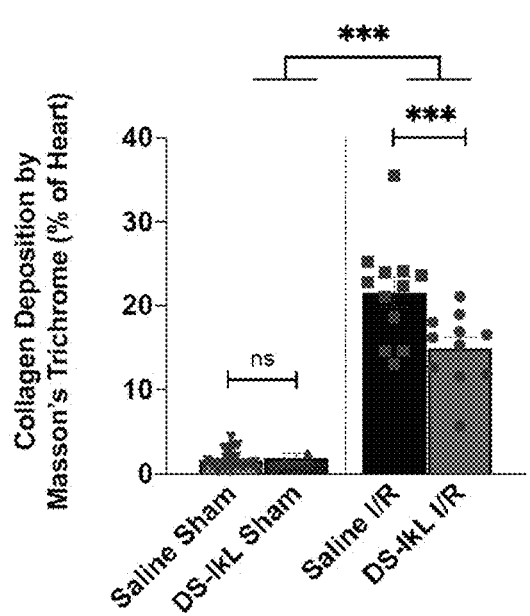

FIG. 24 is a graph showing collagen deposition 2 weeks after ischemia and reperfusion, measured as percent of heart in Masson's Trichrome stained sections. Animals were treated with DS-IkL (n=7) or saline (n=5). Data are represented as means±SEM. *p<0.05, ***p<0.001.

Figure 25:
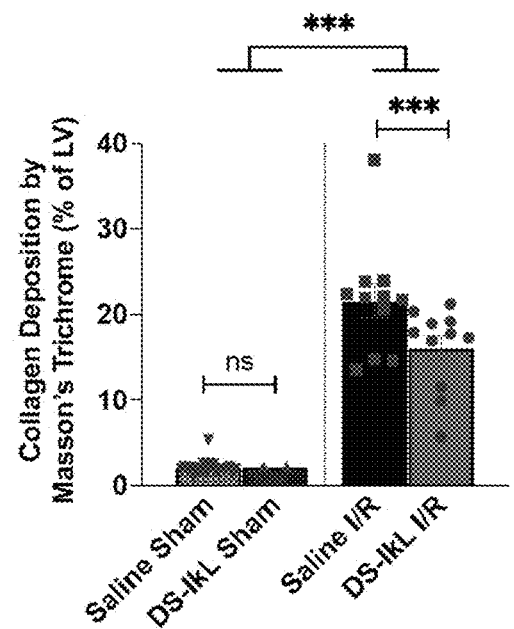

FIG. 25 is a graph showing collagen deposition 2 weeks after ischemia and reperfusion, measured as percent of left ventricle in Masson's Trichrome stained sections. Animals were treated with DS-IkL (n=7) or saline (n=5). Data are represented as means SEM. ***p<0.001.

FIG. 26 is a graph showing collagen deposition 2 weeks after ischemia and reperfusion, measured as percent of heart in Picrosirius Red stained sections. Animals were treated with DS-IkL (n=7) or saline (n=5). Data are represented as means±SEM. ***p<0.001.

FIG. 27 is a graph showing collagen deposition 2 weeks after ischemia and reperfusion, measured as percent of left ventricle in Picrosirius Red stained sections. Animals were treated with DS-IkL (n=7) or saline (n=5). Data are represented as means±SEM. *p<0.05, ***p<0.001.

FIG. 28 presents results from a flow cytometric analysis of neutrophils based on the presence of CD11b/Lys6-C/G from all four groups of the mice of FIG. 14.

Figure 29:
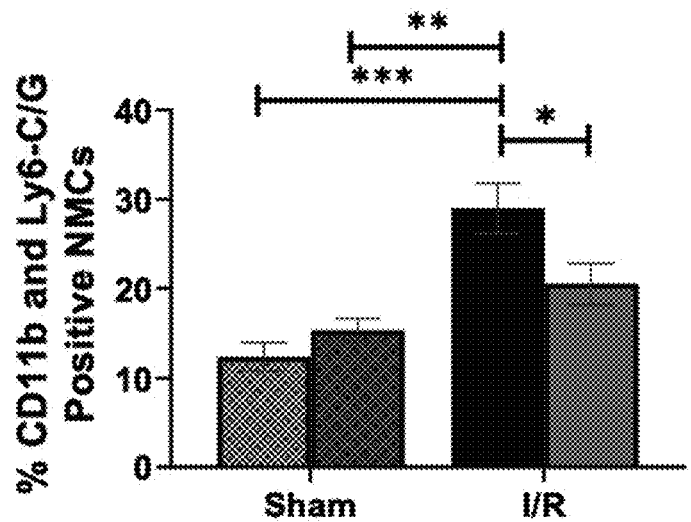

FIG. 29 is a graph of summary data showing that there was a significant reduction in neutrophils in the DS-IkL I/R group, relative to the saline ischemia/reperfusion group of the mice of FIG. 14. Data are represented as means±SEM. *p<0.05, p<0.01, *p<0.001.

Figure 12:
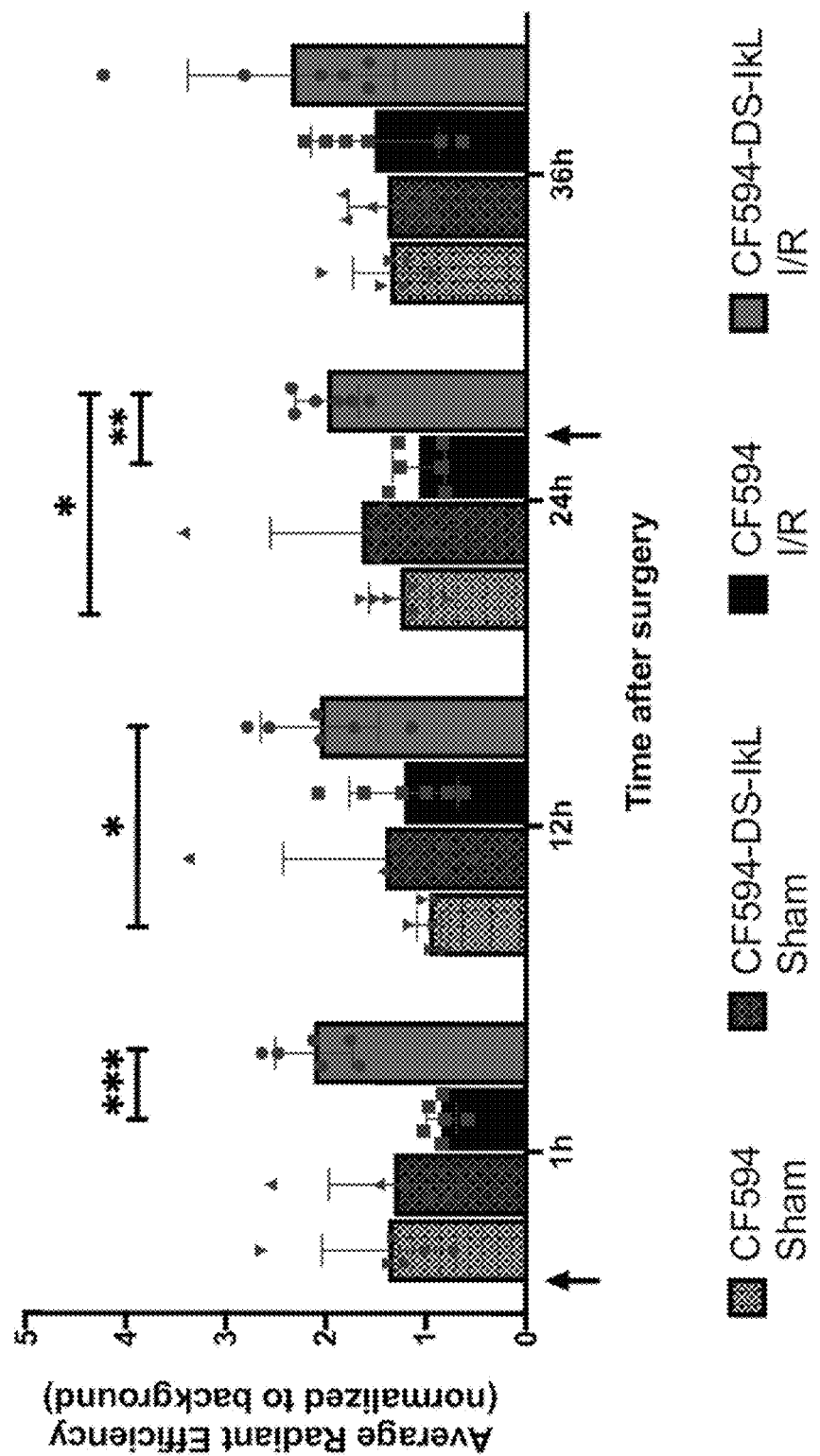
Figure 30:
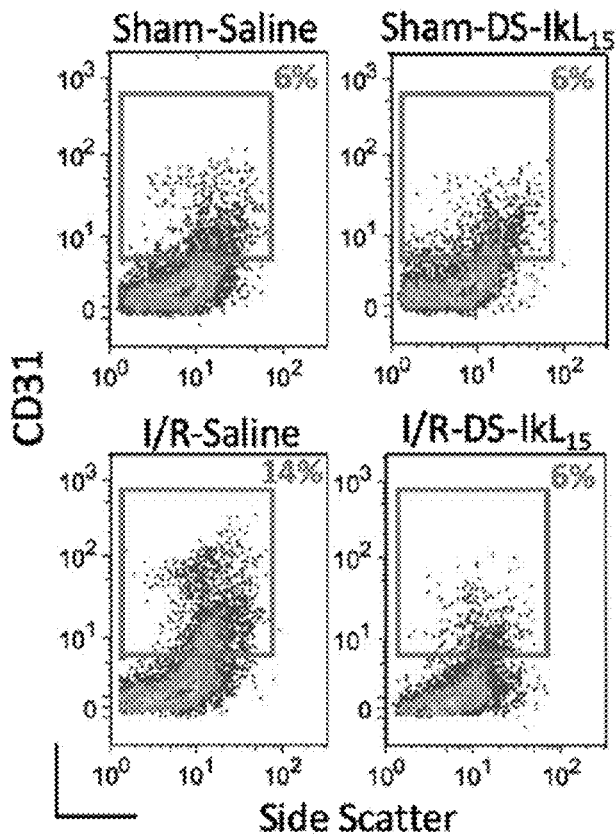

FIG. 30 presents results from CD31 flow cytometric analysis of endothelial cells in all four groups of the mice of FIG. 12. n=5 mice per group for flow cytometric analysis.

Figure 31:
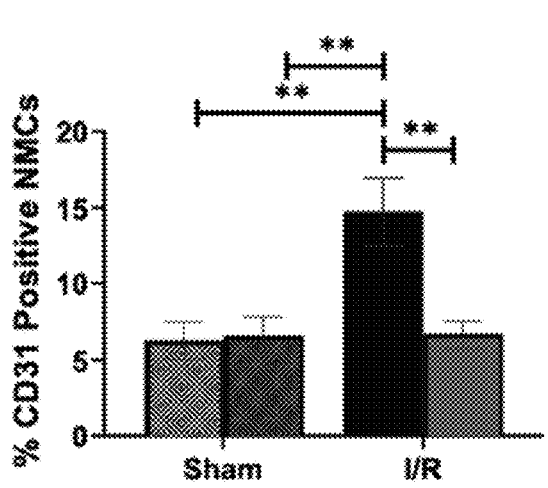

FIG. 31 is a graph of summary data showing a significant increase in endothelial cells in saline ischemia/reperfusion group of the mice of FIG. 12 relative to saline sham. DS-IkL prevented the increase. Data are represented as means±SEM. **p<0.01.

Figure 32:
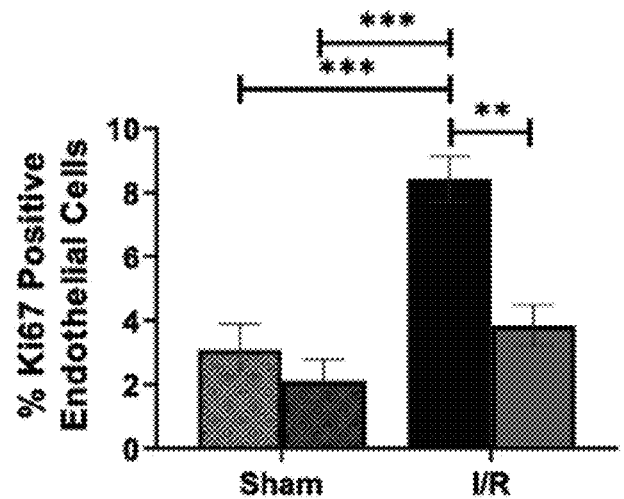

FIG. 32 is a graph showing that an assessment of proliferation using the Ki67 proliferative marker showed a similar trend to that of FIG. 31. Data are represented as means±SEM. p<0.01, *p<0.001.

Figure 33:
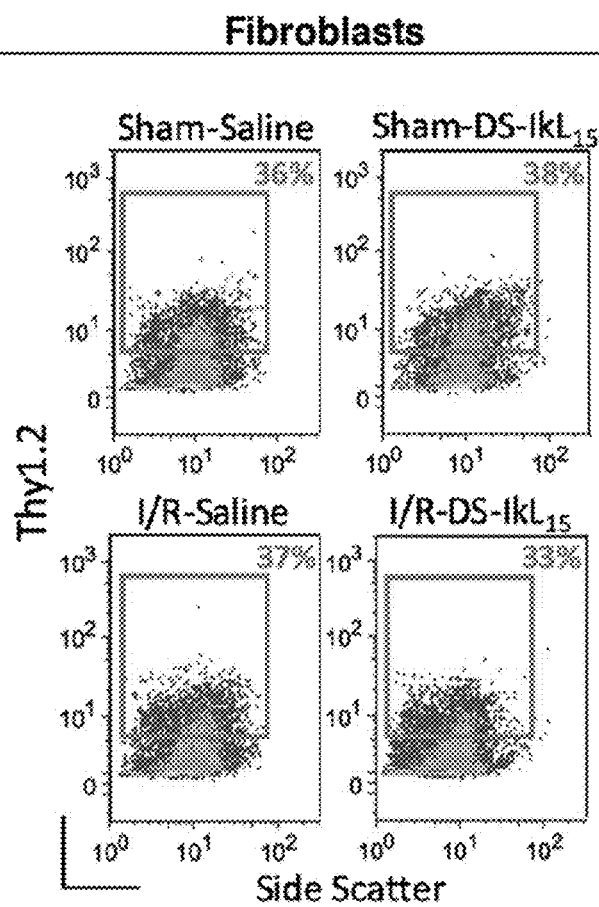

FIG. 33 presents results from Thy1.2 flow cytometric analysis of fibroblasts in all four groups of the mice of FIG. 12. n=5 mice per group for flow cytometric analysis.

Figure 34:
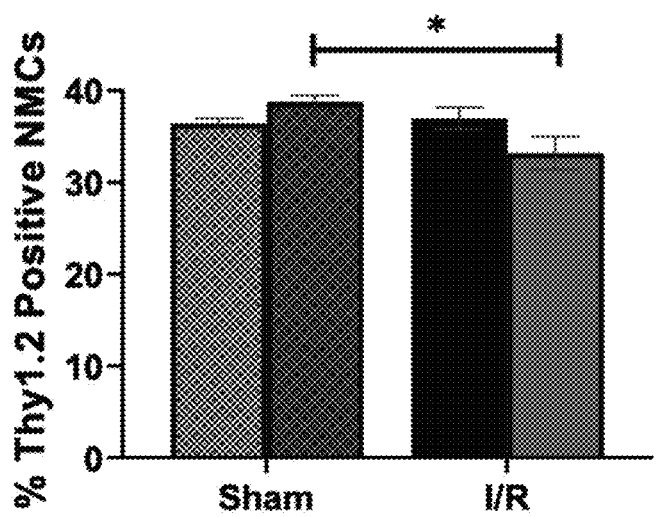

FIG. 34 is a graph of summary data of Thy1.2 positive cells of FIG. 33. Data are represented as means±SEM. *p<0.05.

Figure 35:
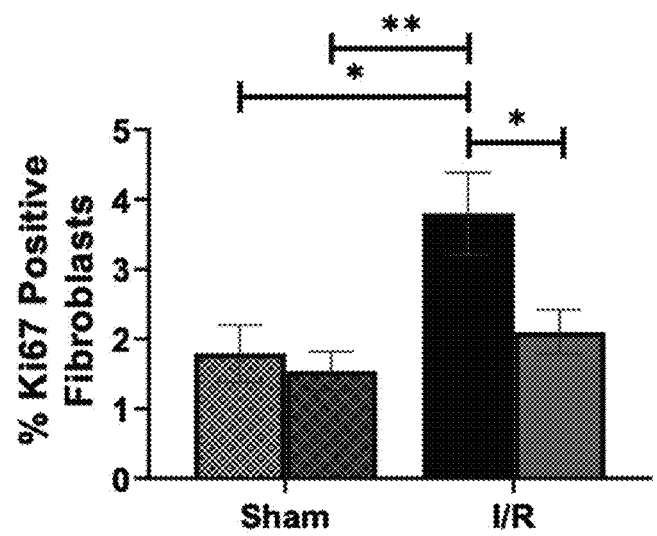

FIG. 35 is a graph of summary data showing proliferative Thy1.2 positive cells of FIG. 33 using Ki67. Nucleated cells were selected from the mixed population based on the incorporation of 7-ADD and the separation of the myocytes from the non-myocyte cells using cardiac myosin heavy chain (MF20) specific antibody. X and Y axes represent arbitrary units. Data are represented as means±SEM. *p<0.05, **p<0.01.

Figure 36:
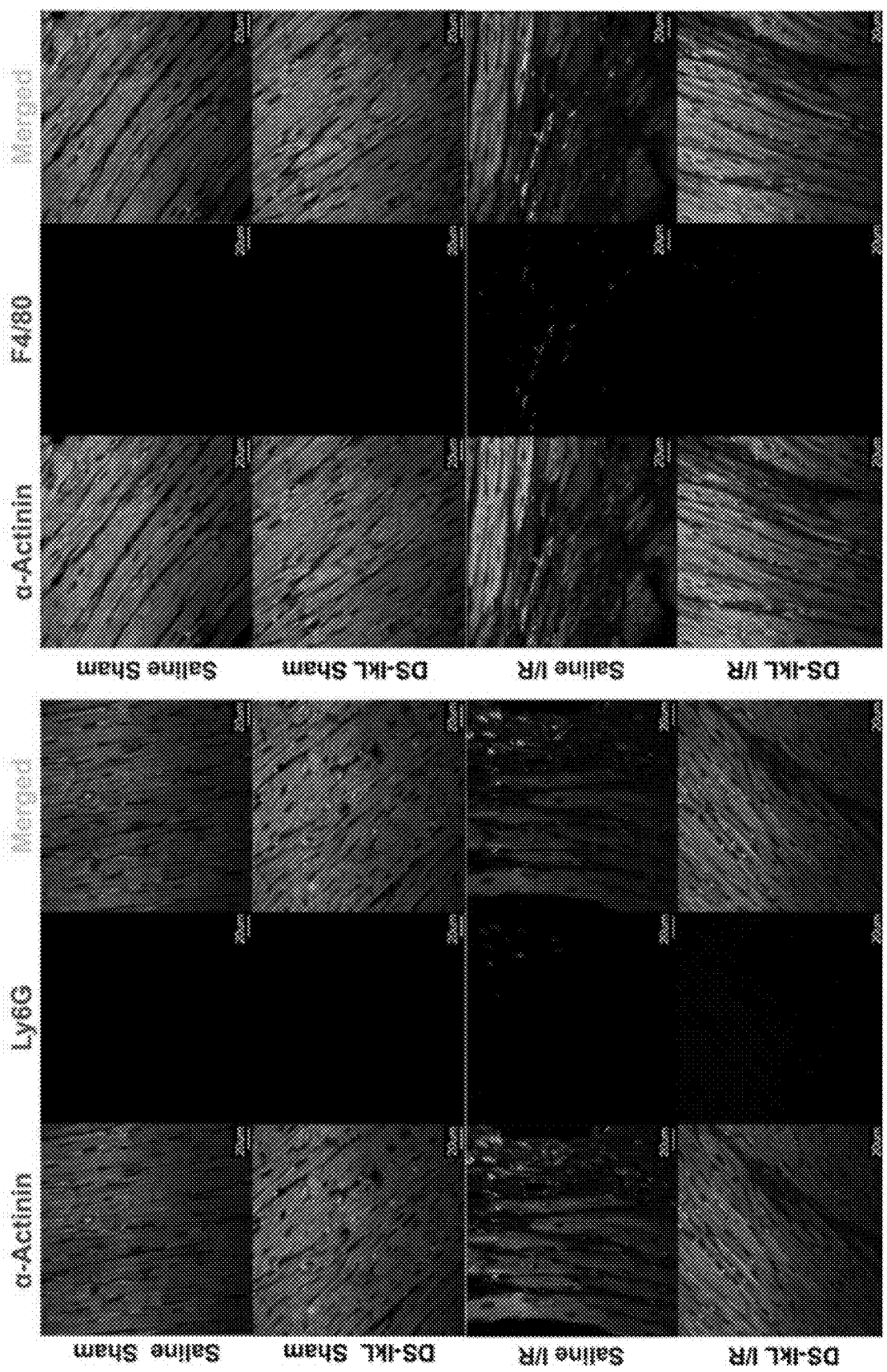

FIG. 36 presents representative immunohistochemistry images for all four groups of the mice of FIG. 14 showing the accumulation of neutrophils (Ly6G) and macrophages (F4/80) after 2 weeks of ischemia/reperfusion. n=3 mice per group for immunohistochemistry.

Figure 37:
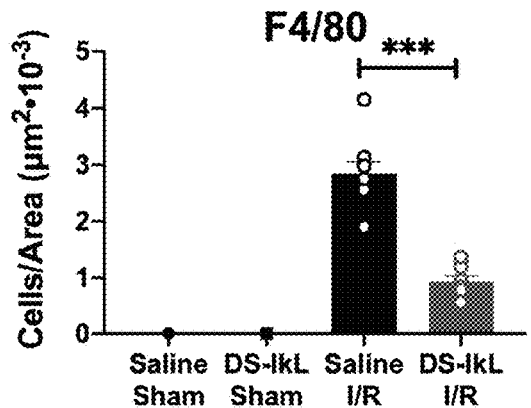

FIG. 37 is a graph showing that DS-IkL prevented accumulation of macrophages in the mice of FIG. 14. ***p<0.001.

Figure 38:
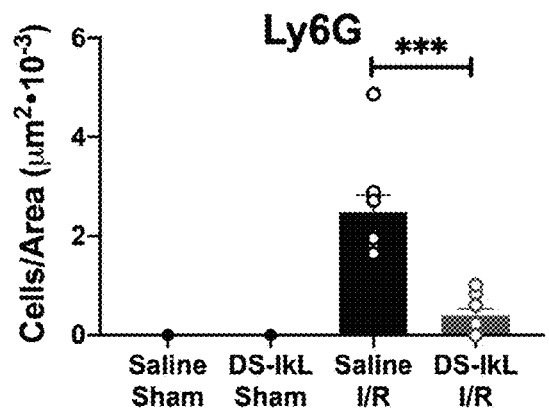

FIG. 38 is a graph showing that DS-IkL prevented accumulation of neutrophils in the mice of FIG. 14. ***p<0.001.

Figure 39:
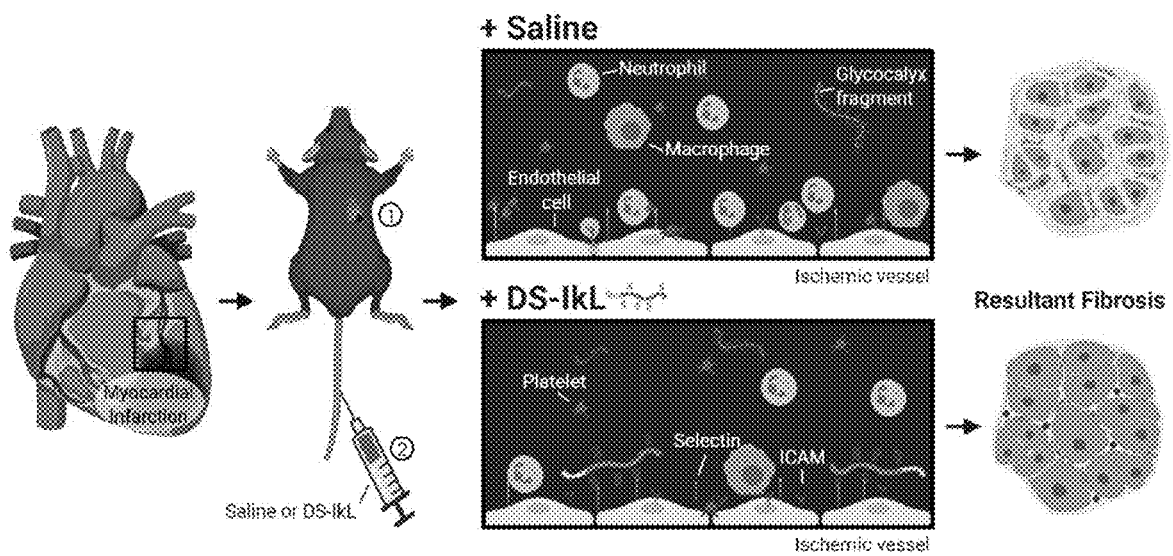

FIG. 39 is an illustration of the binding of DS-IkL to the damaged endothelial cell layer preventing multiple parts of the immune response from occurring, which ultimately resulted in less fibrosis and improved cardiac function in vivo.

DETAILED DESCRIPTION

The inventors have surprisingly identified novel selectin binding peptide ligand sequences composed of L- and D-amino acids. These peptide ligands advantageously discourage neutrophil binding and migration, e.g., interactions within damaged regions of the vasculature. Advantageously, the D-amino acids of the peptide ligand sequences disclosed herein can increase the enzymatic stability of the ligand molecule in harsh inflammatory environments characterized by elevated levels of matrix metalloproteinases and other proteolytic enzymes. Peptide conjugates incorporating these peptide ligands have also unexpectedly been found to suppress neutrophil capture and adhesion, e.g., binding, as effectively as EC-SEAL despite having fewer peptides on average per biopolymer backbone. These peptide conjugates can interfere with neutrophil interactions with, for example, E-selectin substrates and cytokine stimulated cardiac-derived endothelial cells. In some embodiments, the peptide conjugates form a selectin targeting anti-adhesive coating (termed DS-IkL) consisting of a dermatan sulfate backbone and multiple selectin-binding peptides that diminish the ability of neutrophils to migrate through inflamed endothelium into peripheral tissue. DS-IkL is unique to small molecule E-selectin inhibitors in that one DS-IkL molecule can interact with multiple selectin receptors to suppress neutrophil engagement.

Furthermore, the DS component coats the cells with a GAG layer that resembles GAGs present in the native endothelial glycocalyx. This coating can therefore provide a protective barrier that limits cell signaling from the vessel surface to circulating cellular components The protective effects exhibited by the DS-IkL molecule also can mitigate platelet activation on endothelial cells, maintaining an activation state similar to that of unstimulated endothelial cells. In some embodiments, treatment with the peptide conjugates provided herein can provide these and other therapeutic effects by, e.g., reducing reperfusion injury mediated by the immune response to a myocardial infarction. Treatment with the peptide conjugates can, for example, provide one or more of improved cardiac function, reduced fibrosis, and significant decreases in neutrophil, macrophage, proliferative fibroblasts, and proliferative endothelial cells in the infarcted region.

Peptide Conjugates

One provided peptide conjugate includes a biopolymer conjugated to one or more peptide ligands capable of binding to selectin receptors. As used herein, the term "peptide ligand" refers to an amino acid chain linked by peptide or amide bonds. As used herein, the term "biopolymer" refers to either a naturally occurring polymer, or a synthetic polymer that is compatible with a biological system or that mimics naturally occurring polymers. For example, and not by way of limitation, biopolymers of the present invention include polysaccharides, oligosaccharides, proteins, polyketides, peptoids, hydrogels, poly(glycols) such as poly(ethylene glycol), and polylactates. In some embodiments, the biopolymer is a glycosaminoglycan (GAG). The one or more peptide ligands of the peptide conjugate can each be identical to one another, or at least one of the peptides can be different from at least one other of the one or more peptides. In some embodiments, each of the one or more peptide ligands is different from the other of the peptide ligands.

The peptide ligands are synthetic peptides that include both L- and D-amino acids. The presence of D-amino acids in the peptide ligands can beneficially reduce the rate of enzymatic degradation of the peptides, increasing their half-life and therapeutic residence time. The percentage of D-amino acids in each peptide ligand can independently be, for example, from 10% to 50%, e.g., from 10% to 34%, from 14% to 38%, from 18% to 42%, from 22% to 46%, or from 26% to 50%. In terms of upper limits, the D-amino acid percentage in each peptide can be less than 50%, e.g., less than 46%, less than 42%, less than 38%, less than 34%, less than 30%, less than 26%, less than 22%, less than 18%, less than 14%. In terms of lower limits, the D-amino acid percentage in each peptide can be greater than 10%, e.g., greater than 14%, greater than 18%, greater than 22%, greater than 26%, greater than 30%, greater than 34%, greater than 38%, greater than 42%, or greater than 46%. Higher percentages, e.g., greater than 50%, and lower percentages, e.g., less than 10%, are also contemplated.

In some embodiments, at least one of the one or more peptide ligands of the peptide conjugate includes one or more non-proteinogenic amino acids. In certain aspects, each of the one or more peptide ligands independently includes one or more non-proteinogenic amino acids. The number of non-proteinogenic amino acids in a peptide ligand of the conjugate can be, for example, one, two, three, four, five, six, seven, eight, nine, ten, or more than ten. In some embodiments, at least one of the peptide ligands includes hydroxyproline (Hyp).

The amino acid sequence length of each of the peptide ligands of the peptide conjugate can independently be, for example, from 3 to 13, e.g., from 3 to 9, from 4 to 10, from 5 to 11, from 6 to 12, or from 7 to 13. In terms of upper limits, each peptide ligand can have an amino acid sequence length less than 13, e.g., less than 12, less than 11, less than 10, less than 9, less than 8, less than 7, less than 6, less than 5, or less than 4. In terms of lower limits, each peptide ligand can have an amino acid sequence length greater than 3, e.g., greater than 4, greater than 5, greater than 6, greater than 7, greater than 8, greater than 9, greater than 10, greater than 11, or greater than 12. Larger sequence lengths, e.g., greater than 13, and smaller sequence lengths, e.g., less than 3, are also contemplated.

In some embodiments, at least one of the peptide ligands of the peptide conjugate comprises an amino acid sequence selected from IkLLpHypR, IkLLpHypRGC, and IkLLpHypGRGs, wherein Hyp refers to hydroxyproline, wherein other lowercase letters refer to D-amino acids, and wherein other uppercase letters refer to L-amino acids. In some embodiments, each of the peptide ligands of the peptide conjugate comprises an amino acid sequence selected from IkLLpHypR, IkLLpHypRGC, and IkLLpHypGRGs. In some embodiments, at least one of the peptide ligands of the peptide conjugate consists of an amino acid sequence selected from IkLLpHypR, IkLLpHypRGC, and IkLLpHypGRGs. In some embodiments, each of the peptide ligands of the peptide conjugate consists of an amino acid sequence selected from IkLLpHypR, IkLLpHypRGC, and IkLLpHypGRGs. In some embodiments, at least one of the peptide ligands of the peptide conjugate comprises an amino acid sequence having at least 80% sequence identity with a sequence selected from IkLLpHypR, IkLLpHypRGC, and IkLLpHypGRGs. In some embodiments, each of the peptide ligands of the peptide conjugate comprises an amino acid sequence having at least 80% sequence identity with a sequence selected from IkLLpHypR, IkLLpHypRGC, and IkLLpHypGRGs. In some embodiments, at least one of the peptide ligands of the peptide conjugate consists of an amino acid sequence having at least 80% sequence identity with a sequence selected from IkLLpHypR, IkLLpHypRGC, and IkLLpHypGRGs. In some embodiments, each of the peptide ligands of the peptide conjugate consists of an amino acid sequence having at least 80% sequence identity with a sequence selected from IkLLpHypR, IkLLpHypRGC, and IkLLpHypGRGs.

Variability can be present in the peptide ligand sequence. For example, the synthetic peptide ligands described herein can be modified by the inclusion of one or more conservative amino acid substitutions. As is well known to those skilled in the art, altering any non-critical amino acid of a peptide by conservative substitution should not significantly alter the activity of that peptide because the side-chain of the replacement amino acid should be able to form similar bonds and contacts to the side chain of the amino acid which has been replaced. Accordingly, any peptide sequence described herein can be modified such that a sequence having at least about 80% sequence identity, or at least about 83% sequence identity, or at least about 85% sequence identity, or at least about 90% sequence identity, or at least about 95% sequence identity, or at least about 98% sequence identity thereto is incorporated in the peptide conjugate, provided the sequence is capable of binding to selectin. Accordingly, in certain embodiments, the peptide ligands can have, for example, amino acid sequences with 80%, 85%, 90%, 95%, or 98% homology with to any of the amino acid sequences.

In one embodiment, the peptide ligand, or the binding unit of the peptide, binds to selectin with a dissociation constant ($K_d$) of less than about 1 mM, or less than about 900 µM, or less than about 800 µM, or less than about 700 µM, or less than about 600 µM, or less than about 500 µM, or less than about 400 µM, or less than about 300 µM, or less than about 200 µM, or less than about 100 µM.

The glycosaminoglycan attached to the synthetic peptide ligand(s) can be selected from the group consisting alginate, agarose, dextran, chondroitin, dermatan, dermatan sulfate, heparin, heparan sulfate, keratin, and hyaluronan. In one embodiment, the glycan is selected from the group consisting of dermatan sulfate, dextran, and heparin. In some embodiments the glycan is dermatan sulfate (DS). Dermatan sulfate is a natural glycosaminoglycan found mostly in skin, but also in blood vessels, heart valves, tendons, lungs and intestinal mucosa. In addition to its role as a major constituent of the skin and other organs, dermatan sulfate is believed to play a part in repairing wounds, regulating the coagulation of blood, and responding to infections, though its role in these processes is not well understood.

The peptide ligand(s) can be directly linked to the glycosaminoglycan, or linked to the glycosaminoglycan via a linker. The linker can include one or more bivalent fragments selected independently in each instance from the group consisting of alkylene, heteroalkylene, cycloalkylene, cycloheteroalkylene, arylene, and heteroarylene, each of which is optionally substituted. As used herein heteroalkylene represents a group resulting from the replacement of one or more carbon atoms in a linear or branched alkylene group with an atom independently selected in each instance from the group consisting of oxygen, nitrogen, phosphorus and sulfur.

The number of peptide ligands linked to each biopolymer of the peptide conjugate can be large enough to provide the desired binding properties of the peptide conjugate to selectin, and small enough to provide efficient and economical processes for producing and using the peptide conjugate. In general, reducing the number of peptide ligands per conjugate can result in advantages associated with lower materials cost in synthesizing the conjugate, and higher therapeutic effects per peptide ligand. The number of peptide ligands linked to each biopolymer of the conjugate can be, for example, from 3 to 33, e.g., from 3 to 21, from 6 to 24, from 9 to 27, from 12 to 30, or from 15 to 33. In terms of upper limits, the number of peptide ligands per biopolymer can be less than 33, e.g., less than 30, less than 27, less than 24, less than 21, less than 18, less than 15, less than 12, less than 9, or less than 6. In terms of lower limits, the number of peptide ligands per biopolymer can be greater than 3, e.g., greater than 6, greater than 9, greater than 12, greater than 15, greater than 18, greater than 21, greater than 24, greater than 27. or greater than 30 The number of peptide ligands can be, for example, 10, 11, 12, 13, 14, 15, 16, 17, 18, 19, or 20. Higher numbers of peptides, e.g., greater than 33, and lower numbers of peptides, e.g., less than 3, are also contemplated.

Methods of Preparing a Peptide Conjugate

The peptide conjugates can be made by available procedures, or any of the procedures described herein. For example, the synthetic peptide ligand(s) can be synthesized according to solid phase peptide synthesis protocols that are available to persons of skill in the art. In one embodiment a peptide precursor is synthesized on a solid support according to the well-known Fmoc protocol, cleaved from the support with trifluoroacetic acid and purified by chromatography according to methods available to persons skilled in the art.

The synthetic peptide ligand can also be synthesized utilizing the methods of biotechnology that are available to persons skilled in the art. In one embodiment, a DNA sequence that encodes the amino acid sequence for the desired peptide ligand is ligated by recombinant DNA techniques known to persons skilled in the art into an expression cassette or expression vector (for example, a plasmid that incorporates an affinity tag for affinity purification of the peptide), a host cell is transfected or transformed with the expression cassette or the expression vector to permit recombinant expression of the peptide ligand, and the peptide is then isolated from the host organism or the growth medium according to methods known by persons skilled in the art (e.g., by affinity purification). Recombinant DNA technology methods are described in Sambrook et al. *Molecular Cloning: A Laboratory Manual*, 3rd Edition, Cold Spring Harbor Laboratory Press, (2001), incorporated herein by reference, and are well-known to the skilled artisan.

The synthetic peptide ligand can be conjugated to a glycan by reacting a free amino group of the peptide with an aldehyde function of the glycan in the presence of a reducing agent, utilizing methods known to persons skilled in the art, to yield the peptide glycan conjugate. In one embodiment an aldehyde function of the glycan (e.g. polysaccharide or glycosaminoglycan) is formed by reacting the glycan with sodium metaperiodate according to methods known to persons skilled in the art.

Hydrophobication of the glycan can be achieved by conjugating a suitably functionalized glycan (e.g., a glycan containing an amine functional group) with a hydrophobic moiety (e.g., glycidyl ether conjugates of alkyl chains, such as isopropyl (C3), butyl (C4), hexyl (C6), octyl (C8), decyl (C10), or dodecyl (C12) glycidyl ether). Although alkyl chains are typically utilized for hydrophobication of the peptide conjugate, it is contemplated that other functional groups can also be incorporated (e.g., amino, thio, ether, etc.) in the alkyl tail.

The synthetic peptide ligand can be conjugated to a glycan by reacting an aldehyde function of the glycan with a crosslinker, e.g., 3-(2-pyridyldithio)propionyl hydrazide (PDPH), to form an intermediate glycan, and further reacting the intermediate glycan with a peptide containing a free thiol group to yield the peptide glycan conjugate. In any of the various embodiments described herein, the sequence of the peptide can be modified to include a glycine-cysteine segment to provide an attachment point for a glycan or a glycan-linker conjugate. In any of the embodiments described herein, the crosslinker can be N-[β-Maleimidopropionic acid]hydrazide (BMPH).

Although specific embodiments have been described in the preceding paragraphs, the peptide conjugates described herein can be made by using any art-recognized method for conjugation of the peptide to the glycan (e.g., a polysaccharide or glycosaminoglycan). This can include covalent, ionic, or hydrogen bonding, either directly or indirectly via a linking group such as a divalent linker. The conjugate is typically formed by covalent bonding of the peptide to the glycan through the formation of amide, ester or imino bonds between acid, aldehyde, hydroxy, amino, or hydrazo groups on the respective components of the conjugate. All of these methods are known in the art or are further described in the Examples section of this disclosure or in Hermanson G. T., *Bioconjugate Techniques*, Academic Press, pp. 169-186 (1996), incorporated herein by reference. The linker typically comprises about 1 to about 30 carbon atoms, more typically about 2 to about 20 carbon atoms. Lower molecular weight linkers (i.e., those having an approximate molecular weight of about 20 to about 500) are typically employed.

In addition, structural modifications of the linker portion of the conjugates are contemplated herein. For example, amino acids can be included in the linker and a number of amino acid substitutions can be made to the linker portion of the conjugate, including but not limited to naturally occurring amino acids, as well as those available from conventional synthetic methods. In another aspect, beta, gamma, and longer chain amino acids can be used in place of one or more alpha amino acids. In another aspect, the linker can be shortened or lengthened, either by changing the number of amino acids included therein, or by including more or fewer beta, gamma, or longer chain amino acids. Similarly, the length and shape of other chemical fragments of the linkers described herein may be modified.

Accordingly, in any of the embodiments described herein, any one or more of the synthetic peptide ligand(s) can have a spacer sequence comprising from one to about five amino acids. It is contemplated that any amino acid, natural or unnatural, can be used in the spacer sequence, provided that the spacer sequence does not significantly interfere with the intended binding of the peptide. Exemplary spacers include, but are not limited to, short sequences comprising from one to five glycine units (e.g., G, GG, GGG, GGGG, or GGGGG), optionally comprising cysteine (e.g., GC, GCG, GSGC, or GGC) and/or serine (e.g., GSG, or GSGSG), or from one to five arginine units (e.g., R, RR, RRR, etc.). The spacer can also comprise non-amino acid moieties, such as polyethylene glycol (PEG), 6-aminohexanoic acid, or combinations thereof, with or without an amino acid spacer. The spacer can be attached to either the C-terminus or the N-terminus of the peptide to provide a point of attachment for a glycan or a glycan-linker conjugate.

In certain embodiments, the spacer comprises more than one binding site, thus creating a branched construct. The binding sites on the spacer can be the same or different, and can be any suitable binding site, such as an amine or carboxylic acid moiety, such that a desired peptide sequence can be bound thereto (e.g. via an amide bond). Thus in certain embodiments, the spacer contains one or more lysine, glutamic acid, or aspartic acid residues. Such constructs can provide peptides having more than one selectin binding unit of the formula $P_nL$, where P is a selectin binding sequence, L is a spacer, and n is an integer from 2 to about 10, or from 2 to 8, or from 2 to 6, or from 2 to 5, or from 2 to 4, or 2, or 3, or 4, or 5, or 6, or 7, or 8, or 9, or 10. For example, the spacer L can be an amino acid sequence such as KGSG, KGC, KKGSG, KKGC, KKKGSG, or KKKGC, etc., providing 2, 3, or 4 binding sites.

In peptide conjugates described herein, the peptide ligands can be bound to the glycan at any suitable point of attachment, such as for example, the C-terminus, the N-terminus, or via a side chain on an amino acid. For example, a peptide can be bound to the glycan via a side chain of an amino acid of the peptide, such as the side of a glutamic acid or aspartic acid residue. In addition, the peptide ligands can be linear, branched, or can contain one or more cyclic peptide sequences.

Methods of Using a Peptide Conjugate

The present disclosure, in one embodiment, provides compositions and methods for treating a patient suffering from a disease associated with endothelial dysfunction. The present disclosure is also directed to inhibiting one or more of neutrophil or platelet binding to endothelium, platelet activation, thrombosis, inflammation resulting from denuding the endothelium, intimal hyperplasia, and/or vasospasm, or its effectiveness in stimulating endothelial cell proliferation or in binding to a denuded vessel, comprising administering an effective amount of a composition provided herein to a patient in need thereof. The compositions, in some embodiments, include a peptide conjugate of the present disclosure.

The term "endothelial dysfunction" is also referred to as "endothelial cell (EC) dysfunction," "dysfunctional endothelium," or "dysfunctional endothelial cells." Endothelial dysfunction can be determined with unmasking or exposure of selectin receptors on the cell surface of an endothelial cell. P-selectin and E-selectin are examples of selectin receptors exposed which are transiently expressed on the cell surface due to damage and inflammation, and chronically expressed in dysfunctional endothelium.

In some embodiments, endothelial dysfunction is characterized with permeated endothelial lining or damaged endothelial cells. In some embodiments, the endothelial dysfunction is characterized by loss of glycocalyx. In some embodiments, the endothelial dysfunction is characterized by a selectin protein expressed on the surface of endothelial cells and exposed to circulation. In some embodiments, the site suffers from inflammation.

A "disease associated with endothelial dysfunction," as used herein, refers to a human disease or condition that is at least in part caused by endothelial dysfunction or that induces endothelial dysfunction. In some embodiments, the disease is COPD. Treating a disease associated with endothelial dysfunction, accordingly, refers to the treatment of the disease, recovering the dysfunctional endothelium, or preventing or ameliorating conditions or symptoms arising from dysfunctional endothelium, such as inflammation, intimal hyperplasia, and thrombosis.

In some embodiments, the disease associated with endothelial dysfunction is a heart disease, or an event associated therewith, e.g., a myocardial infarction. For example, inflammatory responses significantly contribute to further injury after the initial insult of a myocardial infarction. Ischemic coronary vessels undergo drastic alterations to their microstructure and homeostasis upon reperfusion, conducive to immune cell infiltration. Ion imbalance disrupts cell-cell junction integrity along the endothelium (Li, W. and W. Wang. *Biomech. Model. Mechan.* 2018; 17(1): 147-158), creating migration points for neutrophils and macrophages that are recruited to these cytokine-rich environments (Yang, Q. et al. *Am. J. Transl. Res.* 2016; 8(2): 765-77). Furthermore, endothelial cells exhibit signs of endothelial cell dysfunction, namely enhanced cell contractility, upregulated cell adhesion molecules such as E- and P-selectin, and the loss of the glycocalyx (McDonald, K. K. et al. *PLoS One.* 2016; 11(12):e0167576; Yang, Q. et al. *Am. J. Transl. Res.* 2016; 8(2):p. 765-77). The dysfunctional endothelial cell phenotype facilitates neutrophil recruitment and extravasation. Neutrophils that have been recruited to these sites activate and secrete a milieu of pro-inflammatory cytokines that in turn recruit additional leukocytes (Ley, K., et al. *Nat. Rev. Immunol.* 2007; 7(9):678-89), shifting the inflammatory process from restorative to destructive. The provided compositions and methods can therefore be used to limit the initial binding and activation of circulating immune cells and tip the balance back to a restorative state.

In some embodiments, the provided compositions and methods can be used to reduce platelet activation on endothelial cells. For example, the peptide conjugates disclosed herein can cause significant reductions in NAP-2 levels and a trend toward reduction in PF-4, resulting in endothelial cells presenting fewer available platelet activating ligands such as endothelial P-selectin. Furthermore, the provided conjugates can localize to the damaged cardiac region, and limit neutrophil and fibroblast accumulation after ischemia/reperfusion, which results in less tissue fibrosis and improved cardiac function.

Administration and Formulations of Peptide Conjugates

The peptide conjugates described herein can be administered to a patient (e.g., a patient in need of treatment for a lung disease such as COPD, or to inhibit platelet activation, such as that involved in thrombosis, platelet binding to denuded endothelium, thrombosis, inflammation resulting from denuding the endothelium, intimal hyperplasia, or vasospasm). In various embodiments, the peptide conjugates can be administered intravenously or into muscle, for example. Suitable routes for parenteral administration include intravascular, intravenous, intraarterial, intramuscular, cutaneous, subcutaneous, percutaneous, intradermal, and intraepidermal delivery. Suitable means for parenteral administration include needle (including microneedle) injectors, infusion techniques, and catheter-based delivery.

Pharmaceutical compositions of any of the peptide conjugates described herein can be formulated for parenteral administration or catheter-based delivery. For example, such compositions can include: a) a pharmaceutically active amount of one or more of the peptide conjugates; b) a pharmaceutically acceptable pH buffering agent to provide a pH in the range of about pH 4.5 to about pH 9; c) an ionic strength modifying agent in the concentration range of about 0 to about 300 millimolar; and d) a water soluble viscosity modifying agent in the concentration range of about 0.25% to about 10% total formula weight; or any individual component a), b), c), or d); or any combinations of a), b), c) and d).

In various embodiments described herein, the pH buffering agents for use in the compositions and methods herein described are those agents known to the skilled artisan and include, for example, acetate, borate, carbonate, citrate, and phosphate buffers, as well as hydrochloric acid, sodium hydroxide, magnesium oxide, monopotassium phosphate, bicarbonate, ammonia, carbonic acid, hydrochloric acid, sodium citrate, citric acid, acetic acid, disodium hydrogen phosphate, borax, boric acid, sodium hydroxide, diethyl barbituric acid, and proteins, as well as various biological buffers, for example, TAPS, Bicine, Tris, Tricine, HEPES, TES, MOPS, PIPES, cacodylate, or MES.

In various embodiments described herein, the ionic strength modifying agents include those agents known in the art, for example, glycerin, propylene glycol, mannitol, glucose, dextrose, sorbitol, sodium chloride, potassium chloride, and other electrolytes.

Useful viscosity modulating agents include but are not limited to, ionic and non-ionic water soluble polymers; crosslinked acrylic acid polymers such as the "carbomer" family of polymers, e.g., carboxypolyalkylenes that can be obtained commercially under the CARBOPOL® trademark; hydrophilic polymers such as polyethylene oxides, polyoxyethylene-polyoxypropylene copolymers, and polyvinylalcohol; cellulosic polymers and cellulosic polymer derivatives such as hydroxypropyl cellulose, hydroxyethyl cellulose, hydroxypropyl methylcellulose, hydroxypropyl methylcellulose phthalate, methyl cellulose, carboxymethyl cellulose, and etherified cellulose; gums such as tragacanth and xanthan gum; sodium alginate; gelatin, hyaluronic acid and salts thereof, chitosans, gellans or any combination thereof. Typically, non-acidic viscosity enhancing agents, such as a neutral or basic agent are employed in order to facilitate achieving the desired pH of the formulation.

In various embodiments described herein, parenteral formulations can be suitably formulated as a sterile non-aqueous solution or as a dried form to be used in conjunction with a suitable vehicle such as sterile, pyrogen-free water. The preparation of parenteral formulations under sterile conditions, for example, by lyophilization, can readily be accomplished using standard pharmaceutical techniques available to those skilled in the art.

In various embodiments described herein, the solubility of peptide conjugates used in the preparation of a parenteral formulation can be increased by the use of appropriate formulation techniques, such as the incorporation of solubility-enhancing compositions such as mannitol, ethanol, glycerin, polyethylene glycols, propylene glycol, poloxomers, and others known to those of skill in the art.

In various embodiments described herein, formulations for parenteral administration can be formulated to be for immediate and/or modified release. Modified release formulations include delayed, sustained, pulsed, controlled, targeted, and programmed release formulations. Thus, one or more peptide conjugates can be formulated as a solid, semi-solid, or thixotropic liquid for administration as an implanted depot providing modified release of the active compound. Illustrative examples of such formulations include drug-coated stents and copolymeric(dl-lactic, glycolic)acid (PGLA) microspheres. In another embodiment, one or more peptide conjugates, or compositions comprising one or more peptide conjugates, can be continuously administered, where appropriate.

In any of the embodiments described herein, the peptide conjugates can be administered alone or in combination with one or more suitable physiologically or pharmaceutically acceptable carriers, diluents, or excipients. Diluent or carrier ingredients used in the peptide conjugate formulation can be selected so that they do not diminish the desired effects of the peptide conjugates. The peptide conjugate formulation can be in any suitable form. Examples of suitable dosage forms include aqueous solutions of the peptide conjugates, for example, a solution in isotonic saline, 5% glucose, or other well-known pharmaceutically acceptable liquid carriers such as alcohols, glycols, esters, and amides.

Suitable dosages of the peptide conjugates can be determined by standard methods, for example by establishing dose-response curves in laboratory animal models or in clinical trials. Illustratively, suitable dosages of peptide conjugates (administered in a single bolus or over time) include from 1 ng/kg to about 10 mg/kg, 100 ng/kg to about 1 mg/kg, from about 1 µg/kg to about 500 µg/kg, or from about 100 µg/kg to about 400 µg/kg. In each of these embodiments, dose/kg refers to the dose per kilogram of patient mass or body weight. In other illustrative aspects, effective doses can range from about 0.01 µg to about 1000 mg per dose, 1 µg to about 100 mg per dose, or from about 100 µg to about 50 mg per dose, or from about 500 µg to about 10 mg per dose, or from about 1 mg to 10 mg per dose, or from about 1 to about 100 mg per dose, or from about 1 mg to 5000 mg per dose, or from about 1 mg to 3000 mg per dose, or from about 100 mg to 3000 mg per dose, or from about 1000 mg to 3000 mg per dose.

It is also contemplated that any of the formulations described herein can be used to administer the peptide conjugates (e.g., one or more types) either in the absence or the presence of a catheter-based device. The peptide conjugates can be formulated in an excipient. In any of the embodiments described herein, the excipient can have a concentration ranging from about 0.4 mg/mL to about 6 mg/mL. In various embodiments, the concentration of the excipient can range from about 0.5 mg/mL to about 10 mg/mL, about 0.1 mg/mL to about 6 mg/mL, about 0.5 mg/mL to about 3 mg/mL, about 1 mg/mL to about 3 mg/mL, about 0.01 mg/mL to about 10 mg/mL, or about 2 mg/mL to about 4 mg/mL.

The dosage of the peptide conjugates can vary significantly depending on the patient condition, the disease state being treated, the route of administration and tissue distribution, and the possibility of co-usage of other therapeutic treatments. The effective amount to be administered to a patient is based on body surface area, patient weight or mass, and physician assessment of patient condition. In various exemplary embodiments, an effective dose can range from about 1 ng/kg to about 10 mg/kg, from about 100 ng/kg to about 1 mg/kg, from about 1 µg/kg to about 500 µg/kg, or from about 100 µg/kg to about 400 µg/kg. In each of these embodiments, dose/kg refers to the dose per kilogram of patient mass or body weight. In other illustrative aspects, effective doses can range from about 0.01 µg to about 1000 mg per dose, from about 1 µg to about 100 mg per dose, or from about 100 µg to about 50 mg per dose, or from about 500 µg to about 10 mg per dose, or from about 1 mg to 10 mg per dose, or from about 1 to about 100 mg per dose, or from about 1 mg to 5000 mg per dose, or from about 1 mg to 3000 mg per dose, or from about 100 mg to 3000 mg per dose, or from about 1000 mg to 3000 mg per dose. In any of the various embodiments described herein, effective doses can range from about 0.01 µg to about 1000 mg per dose, about 1 µg to about 100 mg per dose, about 100 µg to about 1.0 mg, about 50 µg to about 600 µg, about 50 µg to about 700 µg, about 100 µg to about 200 µg, about 100 µg to about 600 g, about 100 µg to about 500 µg, about 200 µg to about 600 µg, from about 100 µg to about 50 mg per dose, from about 500 µg to about 10 mg per dose, or from about 1 mg to 10 mg per dose. In other illustrative embodiments, effective doses can be 1 µg, 10 µg, 25 µg, 50 µg, 75 g, 100 µg, 125 µg, 150 µg, 200 µg, 250 µg, 275 µg, 300 µg, 350 µg, 400 µg, 450 µg, 500 µg, 550 µg, 575 µg, 600 µg, 625 µg, 650 µg, 675 µg, 700 µg, 800 µg, 900 µg, 1.0 mg, 1.5 mg, 2.0 mg, 10 mg, 100 mg, or 100 mg to 30 grams.

Any effective regimen for administering the peptide conjugates can be used. For example, the peptide conjugates can be administered as a single dose, or as a multiple-dose daily regimen. Further, a staggered regimen, for example, one to five days per week can be used as an alternative to daily treatment.

In any of the embodiments herein described, it is to be understood that a combination of two or more peptide conjugates, differing in the peptide portion, the biopolymer portion, or both, can be used in place of a single peptide conjugate.

Peptide conjugates can be sterilized before, during, and/or after formulation. As used herein "sterilization" or "sterilize" or "sterilized" refers to disinfecting the peptide conjugates by removing unwanted contaminants including, but not limited to, endotoxins and infectious agents.

In various illustrative embodiments, the peptide conjugates can be disinfected and/or sterilized using conventional sterilization techniques including propylene oxide or ethylene oxide treatment, gas plasma sterilization, gamma radiation, electron beam, and/or sterilization with a peracid, such as peracetic acid. Sterilization techniques which do not adversely affect the structure and biotropic properties of the peptide conjugates can be used. Illustrative sterilization techniques include exposing the peptide conjugates to peracetic acid, 1-4 Mrads gamma irradiation (or 1-2.5 Mrads of gamma irradiation), ethylene oxide treatment, sterile filtration, or gas plasma sterilization. In some embodiments, the peptide conjugates are subjected to one or more sterilization processes. For example, the peptide conjugates can be subjected to sterile filtration. The peptide conjugates can be dispensed into any type of container, which can be wrapped in a plastic wrap or a foil wrap, and can be further sterilized after such placement in a container.

The peptide conjugates can be combined with minerals; amino acids; sugars; peptides; proteins; vitamins (such as ascorbic acid); laminin; collagen; fibronectin; hyaluronic acid; fibrin; elastin; aggrecan; growth factors (such as epidermal growth factor, platelet-derived growth factor, transforming growth factor beta, or fibroblast growth factor); glucocorticoids such as dexamethasone; viscoelastic altering agents such as ionic and non-ionic water soluble polymers; acrylic acid polymers; hydrophilic polymers such as polyethylene oxides, polyoxyethylene-polyoxypropylene copolymers, and polyvinylalcohol; cellulosic polymers and cellulosic polymer derivatives such as hydroxypropyl cellulose, hydroxyethyl cellulose, hydroxypropyl methylcellulose, hydroxypropyl methylcellulose phthalate, methyl cellulose, carboxymethyl cellulose, and etherified cellulose; poly(lactic acid); poly(glycolic acid); copolymers of lactic and glycolic acids; or other polymeric agents both natural and synthetic.

Kits

The peptide conjugates can be provided in one or more types of kits. The kit can include packaging with one or more containers, at least one of which contains a peptide conjugate. The kit can also contain instructions for use of the components of the kit. In one embodiment, the kit comprises one or more vessels, vials, or containers that hold one or more peptide conjugates. The kit can also include any of the following components: one or more formulations or concentrations (dosages) of peptide conjugates, a buffer, a sterilizing or disinfecting agent, a syringe, a needle, proteins or polysaccharides, and/or instructional materials describing methods for using the kit reagents. In any of these embodiments, the kit can contain a component selected from the group consisting of a catheter, a stent, a balloon, and a combination thereof. The peptide conjugates can be lyophilized, for example, in a buffer or in water.

Articles of manufacture are also contemplated for any of these embodiments. In any of the kit or article of manufacture embodiments described herein, the kit or article of manufacture can comprise a dose or multiple doses of the peptide conjugates. The peptide conjugates can be in a primary container, for example, a glass vial, such as an amber glass vial with a rubber stopper and/or an aluminum tear-off seal. In another embodiment, the primary container can be plastic or aluminum, and the primary container can be sealed. In another embodiment, the primary container is contained within a secondary container to further protect the composition from light.

In any of the embodiments described herein, the kit or article of manufacture can contain instructions for use. Other suitable kit or article of manufacture components include excipients, disintegrants, binders, salts, local anesthetics (e.g., lidocaine), diluents, preservatives, chelating agents, buffers, tonicity agents, antiseptic agents, wetting agents, emulsifiers, dispersants, stabilizers, and the like. These components can be available separately or admixed with the peptide conjugates. Any of the composition embodiments described herein can be used to formulate the kit or article of manufacture.

EXAMPLES

The present disclosure will be better understood in view of the following non-limiting examples. The following examples are intended for illustrative purposes only and do not limit in any way the scope of the present invention.

Example 1. Identification of IkL Sequence

The selectin binding peptide on EC-SEAL, IELLQARGC, is composed solely of L-amino acids, the naturally occurring enantiomer in human proteins, and is therefore susceptible to enzymatic degradation. The incorporation of D-enantiomers into the peptide was hypothesized to increase residence time of the molecule on the endothelial cell surface, thus maximizing its therapeutic effect. The one-bead-one-peptide split synthesis method (Lam K S et al. *Nature*. 1991; 354(6348):82), illustrated in FIG. 1, was used to create a peptide library with D- and unnatural amino acids, biased toward the IEL sequence. Briefly, Tentagel S beads were swollen in dimethylformamide (DMF) overnight, then split into polypropylene columns. One amino acid was added to each column followed by N,N'-diisopropylcarbodiimide (DIC) and hydroxybenzotriazole (HOBt) and reacted overnight at 23° C. Coupling was confirmed by ninhydrin Kaiser test. Once coupling was complete, beads were combined into a single column, washed (DMF 3×, methanol 3×, DMF 3×), and deprotected with 25% piperidine (15 minutes, 2×). The process was repeated until the desired peptide length of a 7-mer was achieved, resulting in 7 factorial unique peptide sequences. Peptide-conjugated beads were then screened for the ability to bind E-selectin. Beads that stained positive for E-selectin binding were sequenced. This method identified the sequence of interest, Ile-(D)lys-Leu-Leu-(D)pro-Hyp-Arg (termed IkL).

Example 2. Synthesis of DS-IkL

The first iteration of DS-IkL was synthesized by first oxidizing the vicinal diol groups of DS to aldehydes by treatment with sodium metaperiodate ($NaIO_4$). Oxidized DS was reacted with the cross-linking molecule N-[β-maleimidopropionic acid] hydrazide, trifluoroacetic acid salt (BMPH, Thermo Fisher Scientific), with the number of bound BMPH molecules, and therefore degree of oxidation, quantified using size exclusion chromatography. If 28-32 sites had been achieved, IkLLpHypRGC peptide was reacted with DS-$BMPH_{30}$. Once this reaction was complete, semicarbazide hydrochloride (Sigma-Aldrich, St. Louis, Mo.) was added to reduce any unreacted aldehyde groups on the DS backbone. The product was again purified using size exclusion chromatography to yield DS-$BMPH_{30}$-$IkL_{30}$ (termed DS-$IkL_{30}$).

Figure 2:
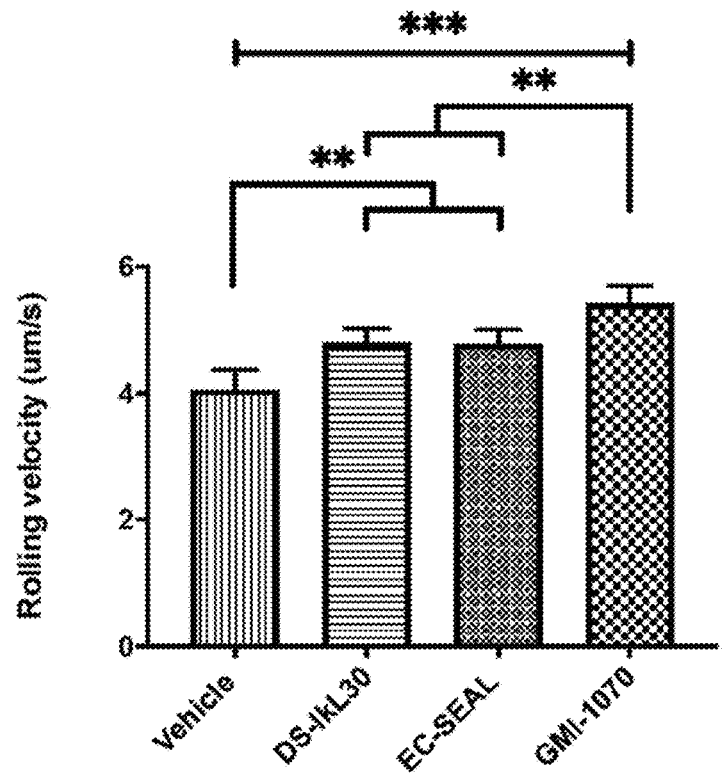

Example 3. Effect of DS-IkL on Polymorphonuclear Neutrophil (PMN) Rolling Velocity To validate DS-$IkL_{30}$, 25-mm glass coverslips were piranha etched and silanized with (3-aminopropyl)triethoxysilane (APTES). Silanized coverslips were functionalized with bis(sulfosuccinimidyl)suberate (BS3) and Protein A/G, then coated with 10 μg/mL of human recombinant E-selectin or E-selectin/intercellular adhesion molecule (ICAM). Coverslips were then treated with Hank's Balanced Salt Solution (HBSS$^{+/+}$), rivipansel (GMI-1070, 100 μM), EC-SEAL (30 μM), or DS-IkL$_{30}$ (30 μM) for 1 hour before being assembled onto a microfluidic chip. Isolated human neutrophils were flowed over the coverslip for 10 minutes using a microfluidic flow chamber at a pathophysiological flow rate of 2 dynes/cm$^2$. A Nikon TE2000 inverted microscope with accompanying NIS Elements software was used to capture phase contrast images of neutrophils interacting with the substrate. Images were taken every 3 seconds for 10 minutes. Neutrophil rolling velocity was determined using the ImageJ plugin MTrack2 by dividing the number of pixels moved by time between frames. Results shown in FIG. 2 indicate that DS-IkL$_{30}$ increases neutrophil rolling velocity to a similar extent as EC-SEAL.

Example 4. Effect of DS-IkL on PMN Binding to E-Selectin Coated Beads

EC-SEAL is currently synthesized using oxidation chemistry, which acts by cleaving the DS backbone at sites of vicinal diol groups to produce aldehydes, to which a linker and then IEL may be conjugated. Although this allows for ready addition of multiple peptides to the DS backbone, it drastically and irreversibly modifies the structure of DS, making it less stable and compromising its resemblance to naturally occurring GAGs. Upon cleavage, the DS backbone changes from resembling a rigid rod to resembling a random coil, with some of the peptides buried within the coiled molecule, thus altering the availability of peptides conjugated to the backbone. In contrast, the synthesis of DS-IkL employs an alternative peptide conjugation chemistry: 4-(4, 6-dimethoxy-1,3,5-triazin-2-yl)-4-methyl-morpholinium chloride (DMTMM). DMTMM is commonly used for activation of carboxylic acids, e.g., for amide coupling. This chemistry has been shown to be more efficient than 1-ethyl-3-(3-dimethylamino-propyl)carbodiimide (EDC) chemistry, another well-established conjugation method (D'Este M et al. *Carbohydr. Polym.* 2014; 108:239). Unlike EDC, DMTMM does not undergo rearrangement once bound to the activated carboxyl group, thereby maintaining the functionality of the carboxyl group and allowing peptide conjugation. To utilize DMTMM chemistry, we synthesized IkL peptide with a GRGs spacer and an N-terminus hydrazide group using established techniques. The peptide is then reacted onto DS via a DMTMM facilitated intermediate reaction. The number of peptides added to DS was controlled by modulating the amount of DMTMM added to the reaction relative to the COOH content of the backbone and peptide to be added. Given DMTMM does not cleave rings within DS, it was hypothesized that a decreases in neutrophil binding to selectins could be achieved to a similar extent as that of the parent sequence, IEL, with fewer conjugated peptides, and potentially at a more dilute solution concentration.

Different conjugation chemistry modifications were tested subsequent to sequence validation. DS-IkL was synthesized with DMTMM or EDC using established lab protocols. For DMTMM experiments, DS was dissolved in phosphate buffer (pH 4.54) and reacted with 45 equivalents of DMTMM for 5 minutes. IkLLpHypGRGs-NH2 was dissolved in phosphate buffer and added to the reaction. The reaction was left to complete for 48-60 hours at room temperature with constant shaking. The reaction was quenched with water to displace any bound DMTMM, and then filtered using tangential flow filtration (TFF) to remove residual peptide and DMTMM. For EDC experiments, DS was dissolved in 2-(N-morpholino)ethanesulfonic acid (MES) buffer (pH 4.54) and reacted with 45 equivalents of EDC for 30 minutes. IkLLpHypGRGs-NH2 was dissolved in MES buffer and added to the reaction. The reaction was allowed to proceed for 48-60 hours at room temperature with constant shaking. The pH was then increased to 8 and left shaking for 30 minutes before TFF purification. Purified molecules were frozen and then lyophilized for future use. The number of peptides bound was quantified by reading absorbance at 280 nm and/or 205 nm on a NanoDrop Microvolume Spectrophotometer and comparing the reading to a standard curve for free peptide. DMTMM chemistry yielded a molecule with an average of 15 peptides per DS (DS-IkL$_{15}$); EDC chemistry yielded a molecule with an average of 10 peptides per DS (DS-IkL$_{10}$).

Figure 3:
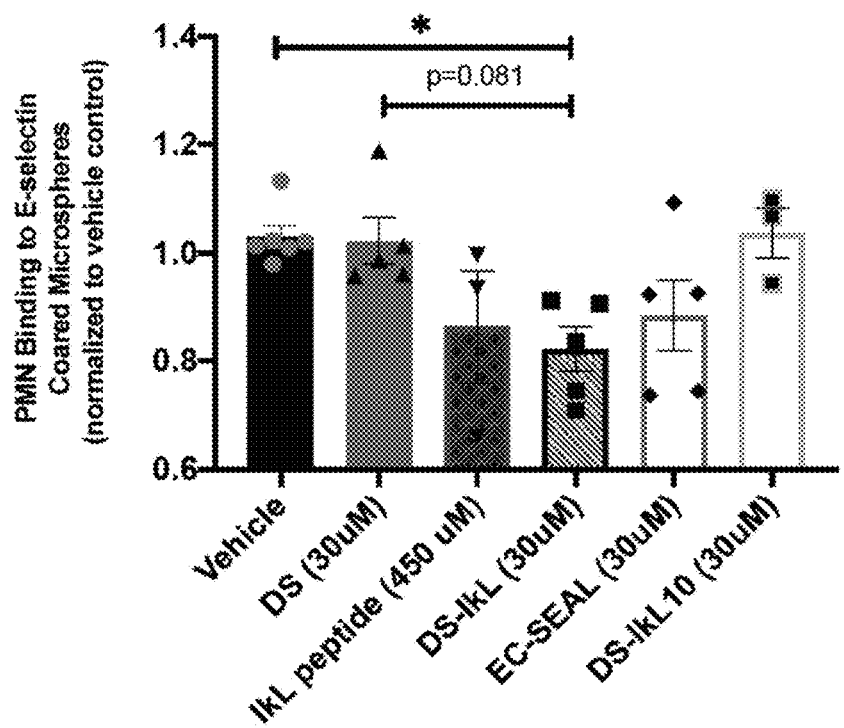

To validate the new molecule, fluorescent carboxylate microspheres were coated with recombinant human E-selectin (R&D Systems, Minneapolis, MN) using a PolyLink coupling kit (PolySciences Inc., Warrington, PA). Functionalized microspheres were treated with HBSS$^{+/+}$, EC-SEAL (30 μM), DS-IkL$_{10}$ (30 μM), DS-IkL$_{15}$ (30 μM), or GMI-1070 (100 M) for one hour. During this time, human neutrophils were isolated from whole blood using an established protocol. Briefly, 6 mL of whole blood were collected into an EDTA coated tube in accordance with the UC Davis Internal Review Board under IRB assurance No. 00004557. Neutrophils were isolated using an EasyStep Direct Human Neutrophil Isolation Kit (Stem Cell Technologies, Vancouver, BC, Canada), centrifuged, and resuspended in HBSS$^{+/+}$, with 0.1% human serum albumin (HSA) at 1×10$^6$ cells/mL. Cells were labeled with fluorescently tagged anti-CD15 for detection. Microspheres were pelleted and resuspended in 100 uL labeled neutrophils, then incubated for 30 minutes at room temperature with rotation (150 rpm). Samples were fixed in 4% PFA and read on an Attune NxT Flow Cytometer. Data was analyzed using FlowJo flow cytometry software (San Diego, Calif.) to determine the top three performing variants. This was repeated 2-6 times for an n of 3-7. Results from this experiment (FIG. 3) indicate DS-IkL$_{15}$ as a promising alternative to EC-SEAL.

Example 5. Effect of DS-IkL on Collagen Deposition Reduction

Figure 4:
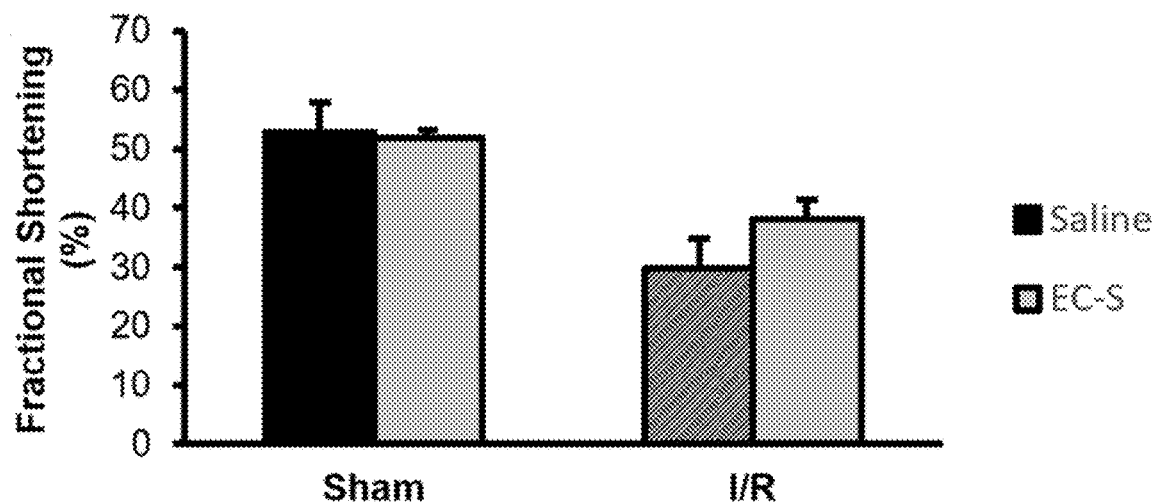
Figure 5:
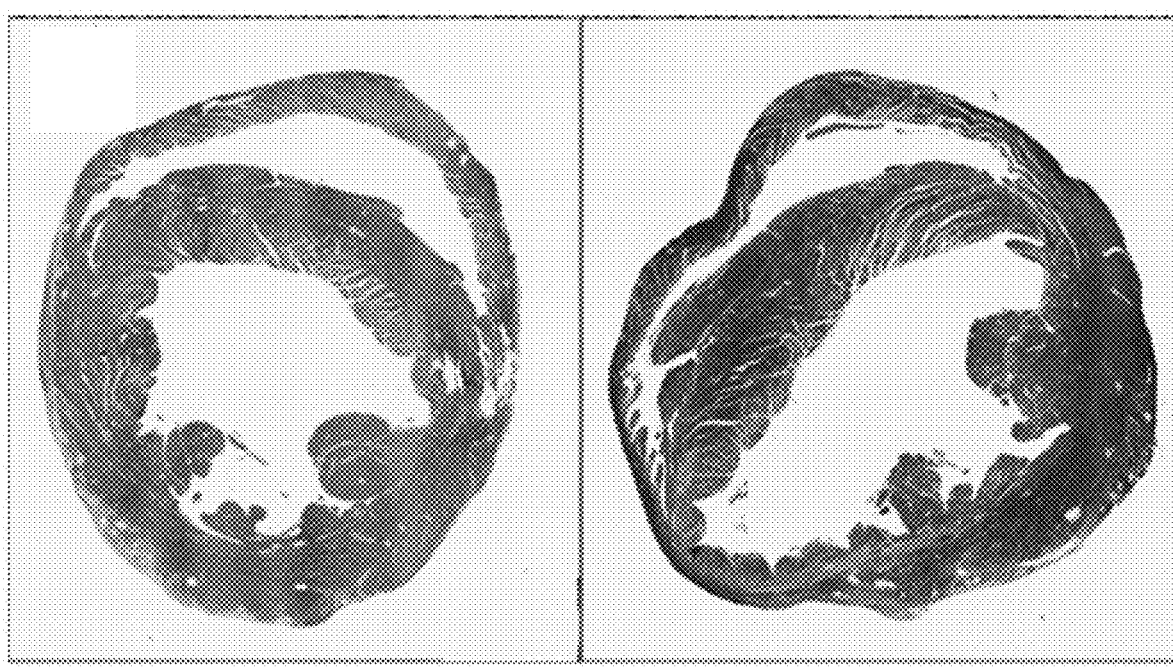

To validate DS-IkL as a mediator to fibrosis, its efficacy was tested in a model of ischemia reperfusion injury at the left anterior descending artery. Reperfusion injury is characterized in part by endothelial dysfunction (Jordan J E et al. *Cardiovasc. Res.* 1999; 43(4):860). During ischemia, cell adhesion molecules such as P-selectin are upregulated and chemotactic factors released that promote neutrophil capture and activation. The loss of endothelial function manifests in part as impaired release of nitric oxide, loss of barrier function, and further upregulation of adhesion molecules, further promoting neutrophil capture, diapedesis, and activation, and eventually leading to collagen deposition and fibrosis in the surrounding tissues. Given the above preliminary data using DS-IkL, it was hypothesized that treatment with DS-IkL$_{15}$ would temper neutrophil infiltration and thereby reduce collagen deposition and fibrosis during ischemia/reperfusion. To test this, 10-12 week old C57JB/6 mice were subjected to 45 minutes of ischemia at the left anterior descending artery (LAD) as confirmed by the presence of ST segment elevation. Ischemia was then released and the animal treated intravenously with 100 μL of DS-IkL$_{15}$ (30

µM) or 0.9% saline via the tail vein. Treatments were repeated 24 hours after reperfusion. Animals were euthanized and hearts harvested after 2 weeks for histological analysis. Treatment with DS-IkL$_{15}$ resulted in improved cardiac function and reduced collagen deposition after 2 weeks, as depicted in FIGS. 4 and 5.

Example 6. DS-IkL Binding to E- and P-Selectin Coated Surfaces

Figure 6:
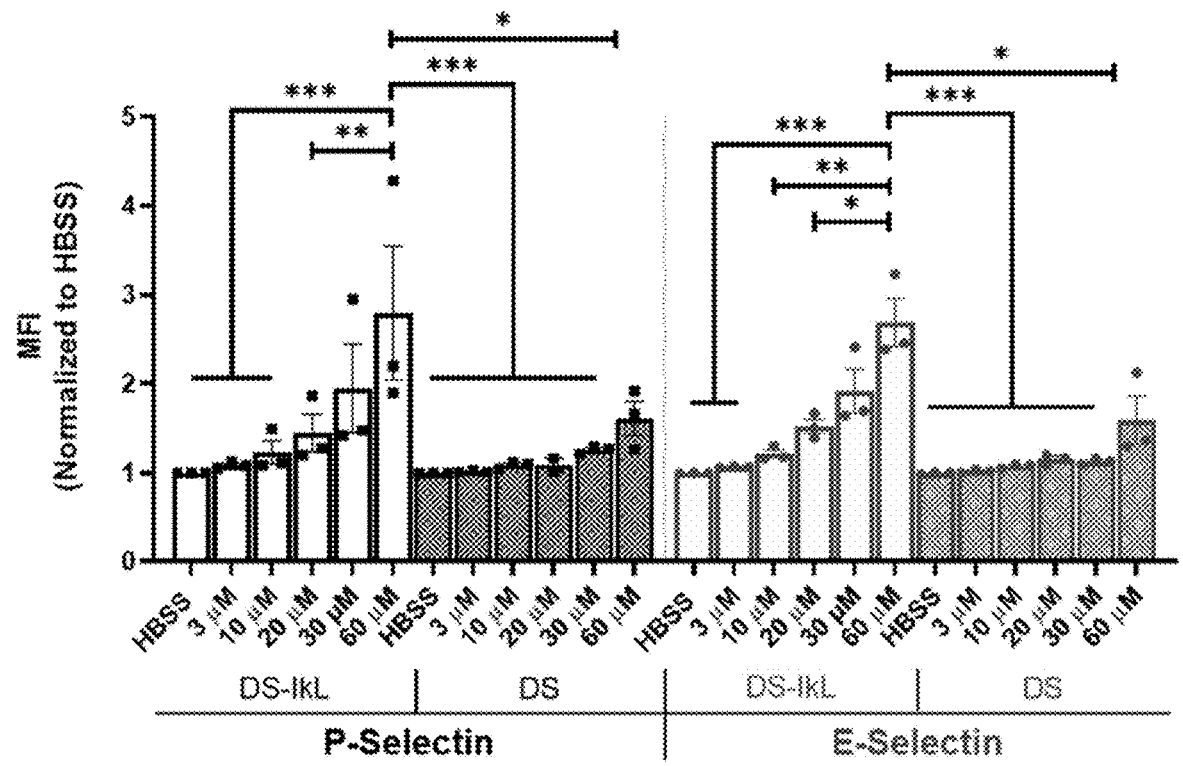

To confirm that DS-IkL binds selectins, P- and E-selectin coated surfaces were treated with increasing concentrations of DS-IkL or DS alone. The data of FIG. 6 show that DS-IkL exhibited significant enhanced binding to both selectins with increasing concentrations of molecule, which is not observed in the DS group. These results demonstrate that the addition of IkL improves binding to P- or E-selectin compared to DS alone. Although E- and P-selectin are very similar molecules, both in structure and function slight differences were observed in binding to E- and P-selectin coated surfaces, with DS-IkL exhibiting more consistent binding to E-selectin at higher concentrations. The results indicate that IkL peptide plays a more influential role in E- and P-selectin binding when DS-IkL is administered at higher concentrations, whereas at lower concentrations, selectin binding may be influenced more by DS. By interacting with both P- and E-selectin, DS-IkL may simultaneously protect from neutrophil interactions, platelet aggregation, and the formation of platelet-neutrophil complexes. Therefore, DS-IkL presents a two-fold cardioprotective potential by limiting damage from both activated platelets and neutrophils

Figure 7:
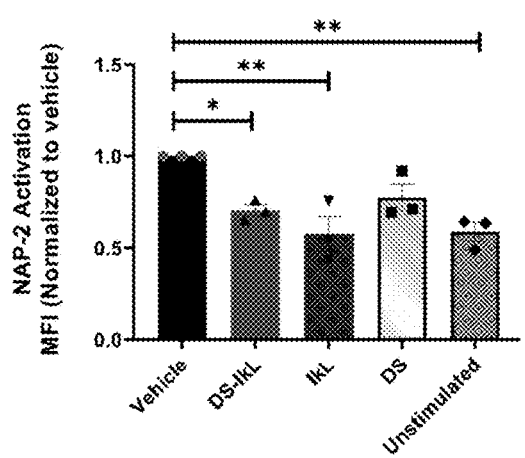
Figure 8:
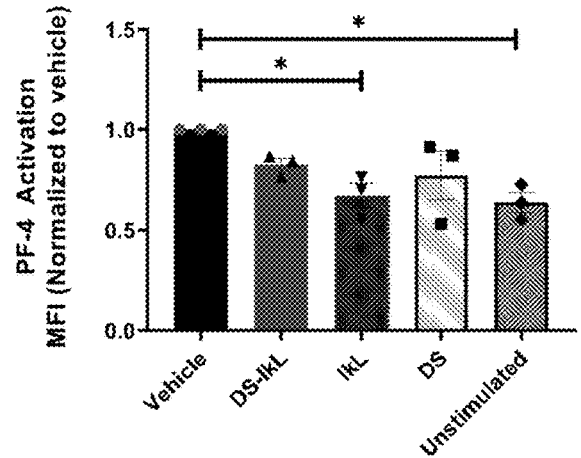

Example 7. Reduction of Platelet Activation on Stimulated Endothelial Cells Through DS-IkL Treatment Enhanced platelet activation and binding have been implicated in a multitude of chronic inflammatory diseases, including acute coronary and pulmonary syndromes (Lisman, T, *Cell Tissue Res.* 2018; 371(3):567-576). Activated platelets release cytokines such as platelet factor 4 (PF-4) and neutrophil activating peptide 2 (NAP-2) that can in turn activate neutrophils (Pitchford, S., D. Pan, and H. C. Welch. *Curr. Opin. Hematol.* 2017; 24(1):23-31). To test if treatment of inflamed endothelial cells with DS-IkL could reduce the activation of platelets as assessed by PF-4 and NAP-2 levels, platelets were allowed to interact with stimulated human cardiac microvascular endothelial cells (HCMECs, PromoCell) under standard culture conditions for 1 hour before supernatant was collected. Stimulation media was prepared by diluting to 0.4 ng/ml tumor necrosis factor alpha (TNF-α) and 0.3 ng/ml interleukin 1 beta (IL-1β) in complete endothelial growth medium MV (PromoCell). Levels of PF-4 and NAP-2 that accumulated in the supernatant during this time were significantly diminished in DS-IkL treated cells (p<0.05), as shown in FIGS. 7 and 8. Notably, DS-IkL reduced NAP-2 activation on stimulated HCMECs to levels similar to unstimulated controls, indicating that the provided molecule has the potential to act as a barrier to platelet-induced neutrophil activation.

Example 8. Reduction of Neutrophil Arrest on E-Selectin Coated Microspheres and Stimulated Endothelial Cells Through DS-IkL Treatment The neutrophil adhesion cascade begins with initial capture and slow rolling along selectins that are upregulated on inflamed endothelium and activated platelets; therefore, interfering with this initial capture could prove therapeutically beneficial. E-selectin coated microspheres were treated with DS (30 µM), IkL peptide (450 µM), DS-IkL$_{15}$ (30 µM), DS-IkL$_{10}$ (30 µM), or vehicle prior to incubation with isolated human neutrophils. Only IkL peptide and DS-IkL$_{15}$ were able to reduce neutrophil adhesion to microspheres to approximately 75% of control (p<0.05, FIG. 9), with DS and DS-IkL$_{10}$ exhibiting similar neutrophil-microsphere co-localization as control. Given the importance of tightly regulated neutrophil capture and activation in proper wound healing (Wang, J. *Cell Tissue Res.* 2018; 371(3):531-539), this slight reduction could be the tipping point back toward a restorative state.

To investigate if the effect of DS-IkL$_{15}$ on neutrophil-selectin interactions was retained on endothelial cells, which are known to upregulate their selectin expression upon stimulation with inflammatory cytokines such as TNF-α and IL-1β (Kuldo, J. M. et al. *Am. J. Physiol. Cell Physiol.* 2005; 289(5):C1229-39), HCMECs were treated with DS-IkL$_{15}$ under stimulatory conditions prior to incubation with neutrophils. Neutrophils exhibited reduced adhesion to treated endothelial cells as compared with vehicle controls (p<0.01, FIG. 10), to a similar extent as on selectin-coated microbeads. These results demonstrate that DS-IkL reduces selectin-mediated neutrophil capture at sites of inflammation.

Example 9. DS-IkL Targeting to the Heart After Ischemia/Reperfusion

Figure 13:
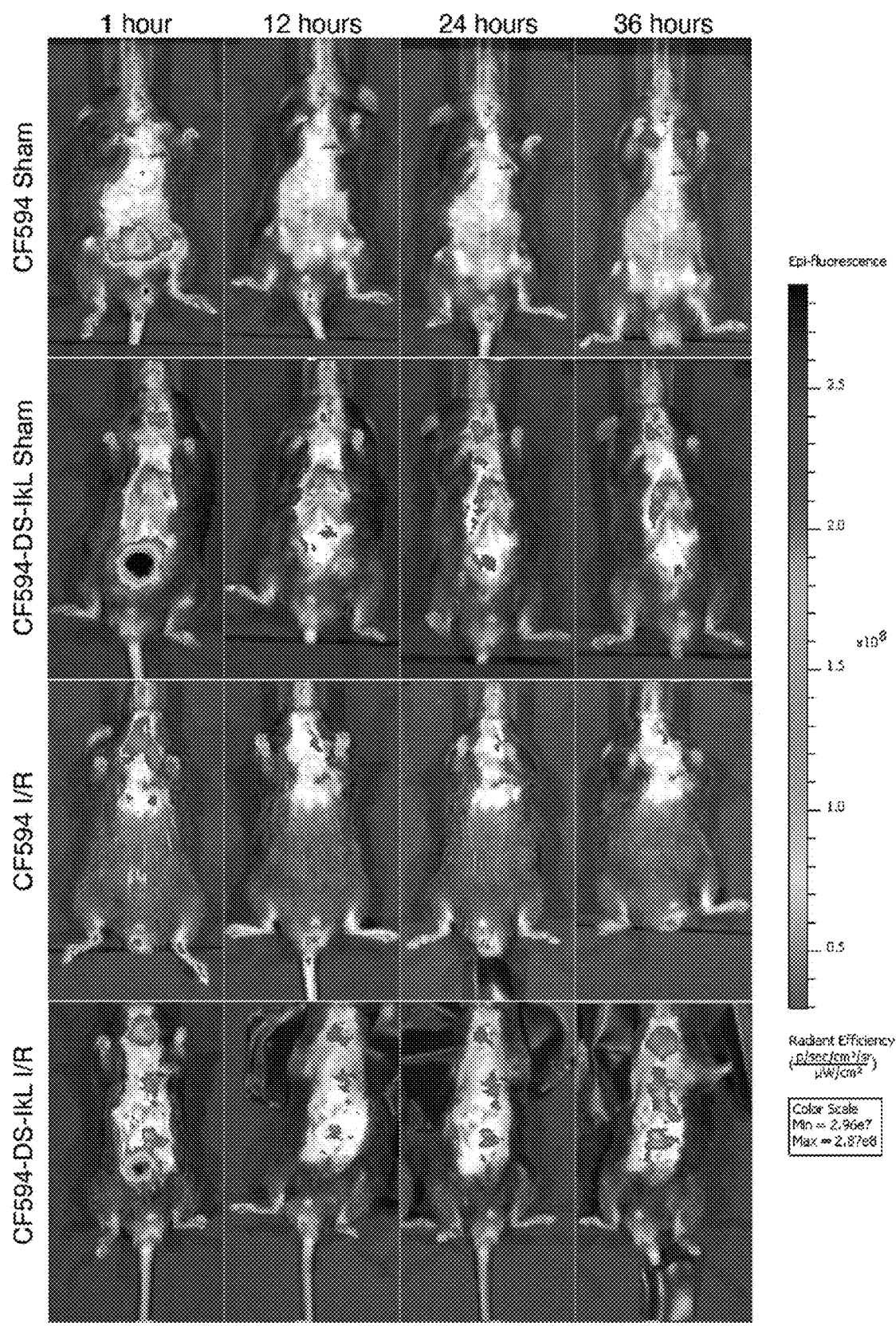

To investigate whether DS-IkL suppression of neutrophil adhesion would occur in vivo following a myocardial infarction, induced by 45 minutes of ischemia at the LAD with subsequent reperfusion, and to verify proper occlusion of the LAD, ECG recordings were monitored during occlusion (FIG. 11). Only ischemia/reperfusion mice with ST-segment elevations were included in the ischemia/reperfusion group. Immediately after sham or LAD operation, either 30 µM DS-IkL conjugated to a fluorophore (CF594-DS-IkL) or saline with equal concentration of the fluorophore was injected, and in vivo fluorescent intensity was monitored at 1, 12, 24, and 36 hours after surgery. Representative images of all four groups are shown in FIG. 13. As evident from these images, fluorescence signals were localized to the cardiac region only in the I/R group after the CF594-DS-IkL injection. Quantitatively, signal intensity was significantly higher an hour after surgery in mice treated with DS-IkL after ischemia/reperfusion, relative to mice treated with the fluorophore dissolved in saline (p<0.001, FIG. 12). There was no difference in fluorescent intensity in the cardiac region in saline sham mice vs saline ischemia/reperfusion mice, indicating that the molecule just circulated in the blood, but did not localize to the heart. In addition, fluorescent signal persisted for at least 24 hours in the cardiac region after ischemia/reperfusion surgery in mice treated with DS-IkL. After a subsequent dosage at the 24-hour mark, no noticeable difference was observed in this group relative to the other groups at the 36 hour time point. Taken together, the in vivo imaging indicated that the DS-IkL targeted to the heart, and the binding of DS-IkL lasted for at least 24 hours

Figure 15:
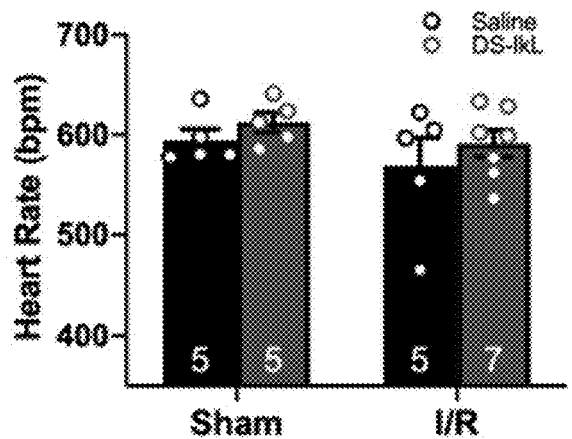
FIG. 15 is a graph showing that heart rate was not significantly different in the conscious mice of FIG. 14.
Figure 16:
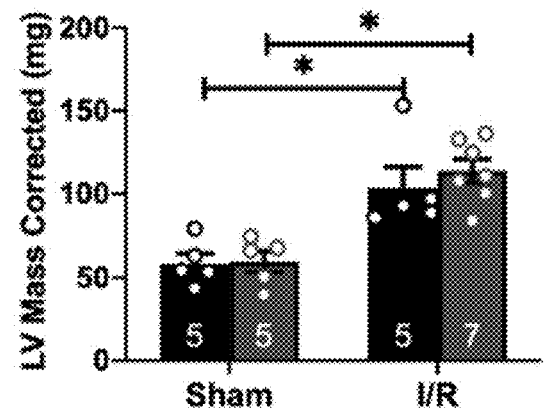
FIG. 16 is a graph showing that ischemia/reperfusion induced an increase in left ventricular (LV) mass in the mice of FIG. 14. Data are represented as means±SEM. *p<0.05.
Figure 17:
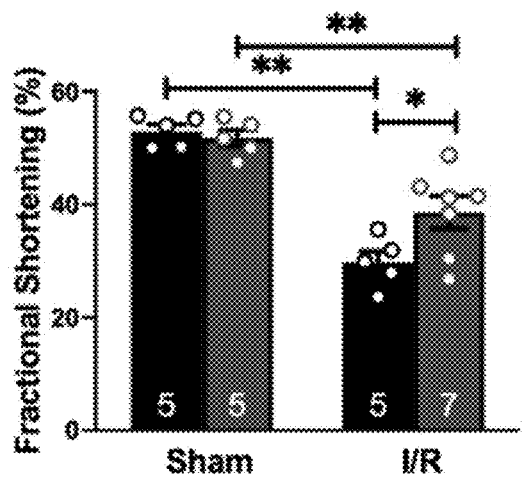
FIG. 17 is a graph showing reduced fractional shortening in the mice of FIG. 14. Data are represented as means±SEM. *p<0.05, **p<0.01.
Figure 18:
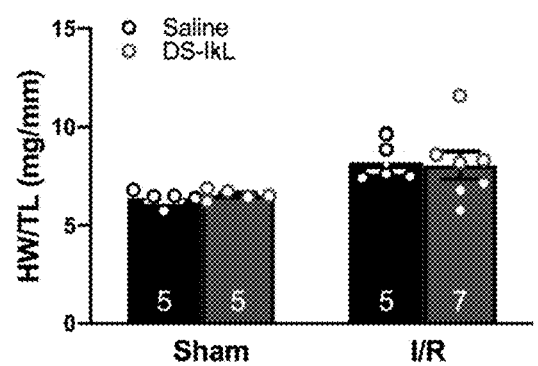
FIG. 18 is a graph showing heart weight normalized to tibial length of all four groups in the mice of FIG. 14. Data are represented as means±SEM.

Example 10. Improved Cardiac Function in Mice Treated With DS-IkL After Ischemia/Reperfusion Sham and 45-minute ischemia/reperfusion were performed to examine the in vivo effects of DS-IkL on cardiac function. The first injection of either saline or DS-IkL was given immediately after surgery, and a subsequent dosage was delivered 24 hours later. Cardiac structure and function were assessed 2 weeks post-operation. Representative M-mode tracings at the parasternal short-axis are shown in FIG. 14 for all four groups and display the beat-to-beat changes in wall thickness and diameter of the left ventricle. Recordings were performed in conscious mice; heart rate in all groups were therefore similar (FIG. 15). Structurally, ischemia/reperfusion resulted in an increase in the left ventricular mass in groups treated with either saline or DS-IkL, relative to their respective sham-operated groups ($p<0.05$, FIG. 16). Similar to the echocardiography findings, ischemia/reperfusion induced an increase in heart weight to tibial length ratio in mice treated with either saline or DS-IkL, relative to their sham-operated controls (FIG. 18). Even though ischemia/reperfusion resulted in a reduction in fractional shortening in both groups, there was a significant improvement in fractional shortening in the DS-IkL treated mice compared to saline alone ($p<0.05$, FIG. 17).

Diastolic function was assessed using the blood flow velocity through the mitral valve during the cardiac cycle. Representative tracings using pulse-wave Doppler showed two distinct waveforms, which correspond to left ventricular filling during early diastole (E wave) and left ventricular filling during late diastole (A wave, FIG. 19). The ratio of the two provides an indication of diastolic function (Gao, S. et al. *Curr. Protoc. Mouse Biol.* 2011; 1:71-83). Mice treated with DS-IkL did not exhibit a change in diastolic function, as compared to their sham control; whereas, mice treated with saline showed a significant reduction in the E/A ratio, indicating an impairment in diastolic function (FIG. 20). Indeed, the E/A ratio of mice treated with DS-IkL was significantly higher than mice treated with saline, after ischemia/reperfusion ($p<0.05$). Although the isovolumetric relaxation time (IVRT) did not change significantly, the MV deceleration time was significantly elevated in the ischemia/reperfusion group treated with saline, relative to the saline sham group ($p<0.05$, FIG. 22). This was not seen when the mice were treated with DS-IkL. Together, these data indicate that both systolic and diastolic function was significantly improved with the treatment with DS-IkL.

Example 11. DS-IkL Limitation of Fibrosis After Ischemia/Reperfusion

Myocardial infarction induces loss of cardiomyocytes with concomitant increase in fibrosis (Talman, V. and H. Ruskoaho. *Cell Tissue Res.* 2016; 365(3):63-81). Histological analyses of cardiac sections were performed 2 weeks after ischemia/reperfusion. Representative whole heart images of all four groups from the previous example, and short-axis sections stained with Masson's Trichrome (MT) and Picrosirius Red (PSR) are shown in FIG. 23. Percentages of fibrotic area relative to the total left ventricular area were quantified in a blinded fashion and were low and not significantly different in the sham-operated groups. In contrast, there was a significant elevation in collagen deposition in both ischemia/reperfusion groups, relative to their respective sham-operated controls ($p<0.01$, FIG. 24). However, ischemia/reperfusion mice treated with DS-IkL showed significantly less fibrosis than mice treated with saline (FIGS. 25-27, $p<0.05$). Together, the data show that DS-IkL limited fibrosis, which in part contributed to the improved cardiac function as assessed by echocardiography.

Example 12. DS-IkL Prevention of Neutrophil and Macrophage Aggregation, Fibroblast Proliferation, and Endothelial Cell Proliferation After Ischemia/Reperfusion Ischemia/reperfusion causes cardiac endothelial cell dysfunction, leading to an amplified inflammatory state and an increase in vascular permeability (Yang, Q. et al. *Am. J. Transl. Res.* 2016; 8(2):765-77). If not tightly regulated, immune cells recruited to the damaged regions accentuate damage and contribute to tissue fibrosis. Non-myocyte cell populations were isolated from the hearts from all four groups from the previous example 36 hours after sham or ischemia/reperfusion surgeries to determine the effect of DS-IkL on neutrophil and fibroblast accumulation. Flow cytometric analysis showed a significant increase in $CD11b^+/Ly6-C/G^+$ neutrophils in the saline treated ischemia/reperfusion group compared to sham controls ($p<0.05$), but no significant increase in the DS-IkL treated ischemia/reperfusion group (FIGS. 28-29), indicating that treatment with DS-IkL limited neutrophil accumulation after ischemia/reperfusion. Furthermore, there was a significant increase in both total ($CD31^+$) and proliferative endothelial cells ($Ki67^+/CD31^+$) in the saline ischemia/reperfusion group, but not in the DS-IkL treated I/R groups (FIGS. 30-32), indicating a significant decrease in adverse vascular remodeling by DS-IkL. Moreover, the percentage of proliferative fibroblasts ($Thy1.2^+$) in the saline ischemia/reperfusion group was significantly higher than in the DS-IkL treated ischemia/reperfusion group (FIGS. 33-35), consistent with the significant increase in collagen deposition observed 2 weeks after reperfusion.

Although the immune response is heightened shortly after a myocardial infarction, the effects can manifest long-term as the body tries to reestablish homeostasis. Immunohistochemistry (IHC) was performed on all four groups after 2 weeks of ischemia/reperfusion to determine the long-term effects of DS-IkL on neutrophil and macrophage accumulation. Representative images of IHC are shown in FIG. 36. Tissue sections were stained with α-actinin to stain for cardiomyocytes, F4/80 to stain for macrophages, and Ly6G to stain for neutrophils. DS-IkL treatment significantly reduced the number of macrophages per area (FIGS. 36 and 37) and neutrophils per area (FIGS. 36 and 38). Together, the data indicate that DS-IkL limited neutrophil and macrophage aggregation, as well as fibroblast and endothelial cell proliferation. Mechanistically, DS-IkL treatment prevented multiple parts of the immune response by acting as a molecular bandage on the damaged endothelial surface, which ultimately resulted in less fibrosis and improved cardiac function (FIG. 39).

Although the foregoing disclosure has been described in some detail by way of illustration and example for purpose of clarity of understanding, one of skill in the art will appreciate that certain changes and modifications within the spirit and scope of the disclosure may be practiced, e.g., within the scope of the appended claims. It should also be understood that aspects of the disclosure and portions of various recited embodiments and features can be combined or interchanged either in whole or in part. In the foregoing descriptions of the various embodiments, those embodiments which refer to another embodiment may be appropriately combined with other embodiments as will be appreciated by one of skill in the art. Furthermore, those of ordinary skill in the art will appreciate that the foregoing description is by way of example only, and is not intended to limit the disclosure. In addition, each reference provided herein is incorporated by reference in its entirety for all purposes to the same extent as if each reference was individually incorporated by reference.

What is claimed is:

1. A peptide conjugate comprising:
   a biopolymer; and
   from 3 to 33 peptide ligands conjugated to the biopolymer, wherein each of the peptide ligands independently comprises an amino acid sequence having at least 85% sequence identity with an amino acid sequence selected from the group consisting of IkLLpHypR, IkLLpHypRGC, and IkLLpHypGRGs, wherein Hyp is hydroxyproline, and wherein other lowercase letters refer to D-amino acids.

2. The peptide conjugate of claim 1, comprising from 10 to 20 peptide ligands conjugated to the biopolymer.

3. The peptide conjugate of claim 1, wherein the percentage of D-amino acids in each peptide ligand is independently from 10% to 50%.

4. The peptide conjugate of claim 1, wherein each peptide ligand independently comprises at least one non-proteinogenic amino acid.

5. The peptide conjugate of claim 4, wherein each peptide ligand comprises at least one hydroxyproline.

6. The peptide conjugate of claim 1, wherein each peptide ligand independently comprises an amino acid sequence selected from the group consisting of IkLLpHypR, IkLLpHypRGC, and IkLLpHypGRGs.

7. The peptide conjugate of claim 1, wherein the biopolymer is a polysaccharide.

8. The peptide conjugate of claim 1, wherein the biopolymer is a glycosaminoglycan.

9. The peptide conjugate of claim 8, wherein the glycosaminoglycan comprises dermatan sulfate.

10. A method for treating a patient suffering from ischemic heart disease, the method comprising administering to the patient a pharmaceutical composition comprising an effective amount of the peptide conjugate of claim 1.

11. The method of claim 10, wherein the patient has experienced a myocardial infarction.

* * * * *

```
                        SEQUENCE LISTING

<160> NUMBER OF SEQ ID NOS: 15

<210> SEQ ID NO 1
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 1

Ile Glu Leu Leu Gln Ala Arg Gly Cys
1               5

<210> SEQ ID NO 2
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<221> NAME/KEY: MOD_RES
<222> LOCATION: (2)..(2)
<223> OTHER INFORMATION: D-Lys
<220> FEATURE:
<221> NAME/KEY: MOD_RES
<222> LOCATION: (5)..(5)
<223> OTHER INFORMATION: D-Pro
<220> FEATURE:
<221> NAME/KEY: MOD_RES
<222> LOCATION: (6)..(6)
<223> OTHER INFORMATION: Hydroxyproline

<400> SEQUENCE: 2

Ile Lys Leu Leu Pro Pro Arg
1               5

<210> SEQ ID NO 3
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<221> NAME/KEY: MOD_RES
<222> LOCATION: (2)..(2)
<223> OTHER INFORMATION: D-Lys
<220> FEATURE:
<221> NAME/KEY: MOD_RES
<222> LOCATION: (5)..(5)
<223> OTHER INFORMATION: D-Pro
<220> FEATURE:
<221> NAME/KEY: MOD_RES
<222> LOCATION: (6)..(6)
<223> OTHER INFORMATION: Hydroxyproline

<400> SEQUENCE: 3

Ile Lys Leu Leu Pro Pro Arg Gly Cys
1               5

<210> SEQ ID NO 4
<211> LENGTH: 10
<212> TYPE: PRT
<213> ORGANISM: Artificial Sequence
<220> FEATURE:
```

```
<223> OTHER INFORMATION: Description of Artificial Sequence: Synthetic
      peptide
<220> FEATURE:
<221> NAME/KEY: MOD_RES
<222> LOCATION: (2)..(2)
<223> OTHER INFORMATION: D-Lys
<220> FEATURE:
<221> NAME/KEY: MOD_RES
<222> LOCATION: (5)..(5)
<223> OTHER INFORMATION: D-Pro
<220> FEATURE:
<221> NAME/KEY: MOD_RES
<222> LOCATION: (6)..(6)
<223> OTHER INFORMATION: Hydroxyproline
<220> FEATURE:
<221> NAME/KEY: MOD_RES
<222> LOCATION: (10)..(10)
<223> OTHER INFORMATION: D-Ser

<400> SEQUENCE: 4

Ile Lys Leu Leu Pro Pro Gly Arg Gly Ser
1               5                   10

<210> SEQ ID NO 5
<211> LENGTH: 5
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<221> NAME/KEY: MISC_FEATURE
<222> LOCATION: (1)..(5)
<223> OTHER INFORMATION: This sequence may encompass 1-5 residues

<400> SEQUENCE: 5

Gly Gly Gly Gly Gly
1               5

<210> SEQ ID NO 6
<211> LENGTH: 4
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 6

Gly Gly Gly Gly
1

<210> SEQ ID NO 7
<211> LENGTH: 5
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 7

Gly Gly Gly Gly Gly
1               5

<210> SEQ ID NO 8
<211> LENGTH: 4
<212> TYPE: PRT
<213> ORGANISM: Artificial Sequence
<220> FEATURE:
<223> OTHER INFORMATION: Description of Artificial Sequence: Synthetic
      peptide
```

```
<400> SEQUENCE: 8

Gly Ser Gly Cys
1

<210> SEQ ID NO 9
<211> LENGTH: 5
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 9

Gly Ser Gly Ser Gly
1               5

<210> SEQ ID NO 10
<211> LENGTH: 5
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<221> NAME/KEY: MISC_FEATURE
<222> LOCATION: (1)..(5)
<223> OTHER INFORMATION: This sequence may encompass 1-5 residues

<400> SEQUENCE: 10

Arg Arg Arg Arg Arg
1               5

<210> SEQ ID NO 11
<211> LENGTH: 4
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 11

Lys Gly Ser Gly
1

<210> SEQ ID NO 12
<211> LENGTH: 5
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 12

Lys Lys Gly Ser Gly
1               5

<210> SEQ ID NO 13
<211> LENGTH: 4
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 13

Lys Lys Gly Cys
1
```

```
<210> SEQ ID NO 14
<211> LENGTH: 6
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 14

Lys Lys Lys Gly Ser Gly
1               5

<210> SEQ ID NO 15
<211> LENGTH: 5
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 15

Lys Lys Lys Gly Cys
1               5
```